(12) United States Patent
Cemper

(10) Patent No.: US 8,964,625 B2
(45) Date of Patent: Feb. 24, 2015

(54) DYNAMIC WIRELESS NETWORK APPARATUSES, SYSTEMS, AND METHODS

(75) Inventor: Kirk E. Cemper, Anna, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 990 days.

(21) Appl. No.: 12/651,008

(22) Filed: Dec. 31, 2009

(65) Prior Publication Data

US 2011/0158210 A1    Jun. 30, 2011

(51) Int. Cl.
*H04B 7/14* (2006.01)
*H04W 40/22* (2009.01)
*H04W 40/20* (2009.01)
*H04W 84/22* (2009.01)

(52) U.S. Cl.
CPC .............. *H04W 40/22* (2013.01); *H04W 40/20* (2013.01); *H04W 84/22* (2013.01)
USPC ........... 370/315; 370/248; 370/259; 370/252; 370/328; 455/11.1; 455/13.1

(58) Field of Classification Search
None
See application file for complete search history.

(56) References Cited

U.S. PATENT DOCUMENTS

| | | | | |
|---|---|---|---|---|
| 5,594,731 | A * | 1/1997 | Reissner | 370/338 |
| 6,816,460 | B1 * | 11/2004 | Ahmed et al. | 370/238 |
| 6,901,593 | B2 * | 5/2005 | Aweya et al. | 718/104 |
| 6,990,316 | B2 * | 1/2006 | Heinonen et al. | 455/41.2 |
| 7,092,391 | B2 * | 8/2006 | Umeda | 370/392 |
| 7,835,301 | B1 * | 11/2010 | Maufer | 370/254 |
| 2004/0103275 | A1 * | 5/2004 | Ji et al. | 713/150 |
| 2004/0219924 | A1 * | 11/2004 | Flynn | 455/446 |
| 2006/0268797 | A1 * | 11/2006 | Cheng et al. | 370/338 |
| 2007/0087695 | A1 * | 4/2007 | Cohen et al. | 455/63.4 |

FOREIGN PATENT DOCUMENTS

EP        1533949 A1 *   5/2005   .............. H04L 12/56

\* cited by examiner

*Primary Examiner* — Kibrom T Hailu
*Assistant Examiner* — James P Duffy

(57) ABSTRACT

Exemplary dynamic wireless network apparatuses, systems, and methods are disclosed. An exemplary system includes a plurality of wireless-network-enabled devices configured to communicate with one another when within wireless transmission range of one another, one of the wireless-network-enabled devices including a gateway to an established network. A wireless-network-enabled device within the wireless-network-enabled devices is configured to exchange telemetry data with one or more of the other wireless-network-enabled devices when located within the wireless transmission range of the one or more of the other wireless-network-enabled devices, and selectively and dynamically perform, based on the exchanged telemetry data, one or more connectivity operations to form a dynamic wireless network configuration. For example, the device may selectively and dynamically establish an upstream connection to one of the one or more of the other wireless-network-enabled devices, based on the exchanged telemetry data, to form a data transmission path between the device and the gateway.

23 Claims, 15 Drawing Sheets

DYNAMIC WIRELESS NETWORK APPARATUSES, SYSTEMS, AND METHODS

BACKGROUND INFORMATION

Advances in electronic communications technologies have interconnected people perhaps better than ever before. For example, the Internet is accessible on all continents of the planet, and costs to access the Internet are relatively low in industrialized nations of the world. However, low-cost access to the Internet is not readily available in certain geographic areas. For example, on the open ocean, access to the Internet is limited to satellite-based systems that are expensive to maintain, require costly hardware and service, and are limited to the footprint of a satellite and its earth station connection. For at least these reasons, there is a need for improved network access technologies, including technologies that can expand the network footprints of established networks and/or provide low-cost access to established networks such as the Internet from the open ocean or other geographic areas where the Internet is not readily or cost-effectively accessible.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
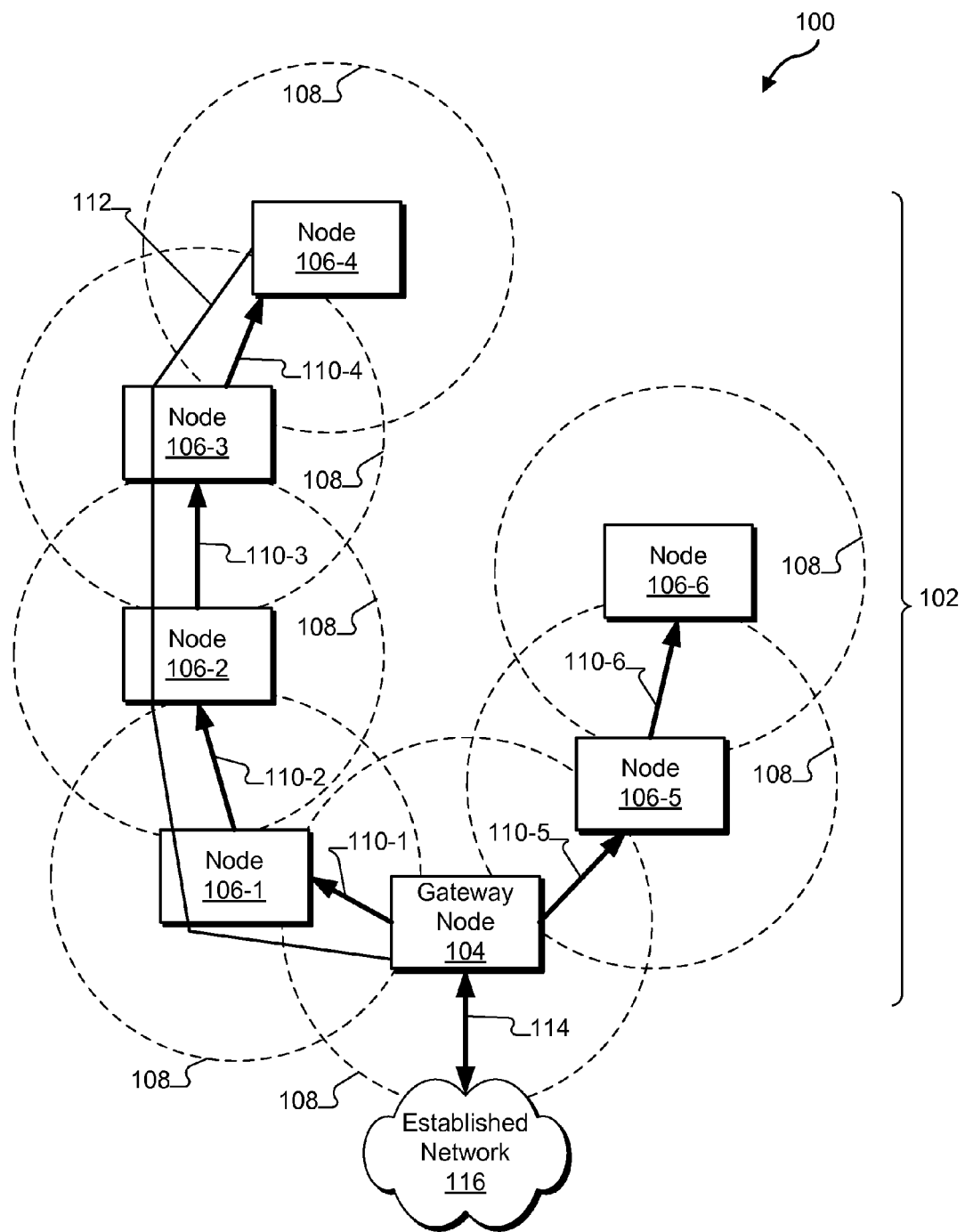
FIG. 1 illustrates a configuration of an exemplary dynamic wireless network system.

Exemplary dynamic wireless network apparatuses, systems, and methods are described herein. In certain embodiments, the exemplary systems and methods described herein may facilitate access to an established network, such as the Internet. In certain implementations, for instance, one or more of the apparatuses, systems, and/or methods described herein may be configured to facilitate low-cost, low-power, adaptive, and/or scalable access to an established network at one or more geographic locations where the established network is otherwise not readily or cost-effectively accessible. For example, the apparatuses, systems, and/or methods described herein may be implemented to provide access to an established network from locations on the open ocean. In certain implementations, one or more of the apparatuses, systems, and/or methods described herein may be configured to dynamically expand the network footprint of an established network such as by leveraging end-user devices to function as nodes within a dynamic wireless network configuration having a gateway to the established network.

As an example, a land-based gateway device may function as a gateway to an established network such as the Internet. One or more mobile wireless-network-enabled devices may be configured to operate in accordance with a gateway-dependent connectivity protocol to exchange telemetry data and to selectively and dynamically establish interconnections between the mobile devices and with the gateway device based on the telemetry data. As connections are established, data transmission paths between mobile devices and the gateway device may be formed such that mobile devices, which may include sea-based mobile devices such as mobile phones and/or sea vessels that are at sea, may be able to communicate with the gateway device to gain access to the established network. The mobile device may be configured to automatically adapt such as by automatically negotiating and renegotiating interconnections such that configurations of the mobile devices are dynamic in nature and able to adapt to changing attributes of the mobile devices (e.g., changing geographic locations of the mobile devices).

In certain embodiments, a plurality of wireless-network-enabled devices may be configured to dynamically and selectively perform one or more connectivity operations, which may include, without limitation, establishing, maintaining, terminating, reconfiguring, and/or optimizing connections between the wireless-network-enabled devices. The connections may form data transmission paths between one or more of the wireless-network-enabled devices and a gateway device configured to function as a gateway to an established network. The connections may be dynamically and selectively established, maintained, terminated, reconfigured, and/or optimized to form the data transmission paths in a way that is designed to optimize communications with the gateway device. The dynamic nature of the connections between the wireless-network-enabled devices may be well-suited for mobile wireless-network-enabled devices (e.g., mobile end-user devices) whose geographic locations and/or other attributes may change.

In certain embodiments, the wireless-network-enabled devices may be configured to exchange telemetry data via one or more network connectivity protocols and dynamically and selectively establish, maintain, terminate, reconfigure, and/or optimize connections between the wireless-network-enabled devices based on the telemetry data that is exchanged between the wireless-network-enabled devices. Telemetry data may include any data that is descriptive of statuses, roles, and/or functions of the wireless-network-enabled devices within a dynamic wireless network system configuration and that may be used to dynamically and selectively establish, maintain, terminate, reconfigure, and/or optimize connections between the wireless-network-enabled devices in a way that is designed to optimize communications with a gateway device functioning as a gateway to an established network. In certain implementations, for example, telemetry data may include data indicating whether a wireless-network-enabled device has a connection to a gateway device, data indicating a number of hops from the wireless-network-enabled device to the gateway device, and data indicating a downstream node count associated with the wireless-network-enabled device (e.g., a number of downstream-connected devices). Based on such telemetry data, a wireless-network-enabled device may be able to selectively and dynamically establish, maintain, terminate, reconfigure, and/or optimize connections to other wireless-enabled-network devices in a way that is designed to optimize communications with a gateway device functioning as a gateway to an established network. Examples of telemetry data, exchanges of telemetry data between wireless-network-enabled devices, and dynamic and selective performance of one or more connectivity operations based on telemetry data are described in more detail further below.

Exemplary dynamic wireless network apparatuses, systems, and methods will now be described in detail in reference to the drawings.

FIG. 1 illustrates an exemplary dynamic wireless network system 100 (or simply "system 100"). As shown, system 100 may include a plurality of nodes 102 comprising a gateway node 104 and a plurality of other nodes 106 (e.g., nodes 106-1 through 106-6) interconnected as shown. The interconnections of nodes 102 to one another illustrated in FIG. 1 is a snapshot view of a configuration of the interconnections as they may exist at a given time and is illustrative only. As described in more detail herein, the interconnections of nodes 102 are dynamic and may change to dynamically and selectively form other configurations of interconnections between nodes 102.

Each node in the plurality of nodes 102 may include or be implemented by a wireless-network-enabled device configured to communicate with other wireless-network-enabled devices. To this end, a node may be configured to transmit and receive wireless communication signals within a wireless transmission range of the node. As used herein, the term "wireless transmission range" may refer generally to any distance, geographic area, and/or geographic space within which nodes may be located relative to one another to allow for successful communications with one another. A wireless transmission range typically corresponds to wireless transmission and reception capabilities of nodes within the plurality of nodes 102.

FIG. 1 illustrates a wireless transmission range 108 for each node within the plurality of nodes 102. While each node is associated with a similarly depicted wireless transmission range 108 in FIG. 1, this is illustrative only. The plurality of nodes 102 may be associated with various wireless transmission ranges in other examples. For instance, one node may have a different wireless transmission range than another node.

Although each node within the plurality of nodes 102 shown in FIG. 1 is associated with a wireless transmission range 108, it will be understood that for a pair of nodes to communicate with one another, each of the nodes in the pair of nodes should be within the wireless transmission range of the other node. In FIG. 1, for example, node 106-3 is located within the wireless transmission range 108 of node 106-4, and node 106-4 is located within the wireless transmission range of node 106-3. Consequently, nodes 106-3 and 106-4 may be said to be located within wireless transmission range (i.e., "in-range") of one another to allow for successful communications with one another such as by exchange of wireless communication signals.

Nodes 102 may be configured to selectively establish inter-nodal connections. For example, FIG. 1 illustrates connections 110 (e.g., connections 110-1 through 110-6) interconnecting nodes 102. In particular, gateway node 104 and node 106-1 are interconnected by connection 110-1, nodes 106-1 and 106-2 are interconnected by connection 110-2, nodes 106-2 and 106-3 are interconnected by connection 110-3, nodes 106-3 and 106-4 are interconnected by connection 110-4, gateway node 104 and node 106-5 are interconnected by connection 110-5, and nodes 106-5 and 106-6 are interconnected by connection 110-6.

Connections 110 may include any established inter-nodal connections capable of facilitating data transmissions between nodes 102. For example, nodes 102 may maintain data representative of connections 110 and utilize the data to determine where and/or when to transmit or refrain from transmitting data transmissions. As used herein, a data transmission may include a transmission of payload data that is not part of a network control protocol. In certain embodiments, connections 110 may include Open Systems Interconnection ("OSI") data link layer connections.

Connections 110 may be associated with upstream and downstream directions. In FIG. 1, connections 110 are graphically depicted as arrows pointing in downstream directions. For example, connection 110-4 interconnecting nodes 106-3 and 106-4 points in a downward direction specifying that node 106-4 is downstream of node 106-3 in system 100. As shown in FIG. 1, the downstream directions of connections 110 point away from gateway node 104. Accordingly, downstream wireless transmissions may move transmitted data away from gateway node 104 and upstream wireless transmissions may move transmitted data toward gateway node 104.

Nodes 102 may be interconnected in a way that forms one or more data transmission paths between nodes 106 and gateway node 104. As used herein, the term "data transmission path" may refer to any path created by a set of one or more nodes 106 interconnected by one or more connections 110 and over which data may be transmitted to and/or received from gateway node 104. To illustrate, FIG. 1 shows a data transmission path 112 between node 106-4 and gateway node 104. As shown, data transmission path 112 is formed by connections 110-1, 110-2, 110-3, and 110-4 interconnecting gateway node 104 and node 106-1, nodes 106-1 and 106-2, nodes 106-2 and 106-3, and nodes 106-3 and 106-4, respectively. Although not expressly called out in FIG. 1, other data transmission paths are formed between other nodes 106 and gateway node 104 in system 100. Thus, each node 106 shown in FIG. 1 that has an upstream connection to another node 106 or gateway node 104 also has an established data transmission path to/from gateway node 104. As described in more detail herein, connections 110 may be selectively established, maintained, terminated, reconfigured, and/or optimized to dynamically interconnect nodes 102 and form data transmission paths in a way that is optimal for sending communications to and receiving communications from gateway node 104.

Connections 110 between nodes 102 may be selectively and dynamically established, maintained, terminated, reconfigured, and/or optimized in accordance with a network connectivity control protocol, which in certain embodiments may be configured to operate at the OSI data link layer. For example, data link layer frames and/or control packets may be exchanged between nodes 102 and used to selectively and dynamically establish, maintain, terminate, reconfigure, and/or optimize one or more connections 110 between nodes 102.

Network control protocol messages and/or other wireless signals may be configured to be transmitted (e.g., broadcast) on one or more channels within a predetermined wireless frequency range. For example, nodes 102 may be configured to broadcast control messages and/or other wireless signals on multiple channels within the frequency range. In addition, nodes 102 may be configured to transmit control messages and/or other wireless signals to particular nodes 102 by transmitting the control messages on particular channels associated with the nodes 102.

In certain embodiments, each node 106 within system 100 may be limited to having no more than a single upstream connection 110, and consequently no more than a single upstream data transmission path to a gateway node such as gateway node 104, at any given time. By implementing this restriction, one or more processes for dynamically configuring nodes 102 within system 100 and/or routing data transmissions within system 100 may be simplified as compared to a network configuration that allows a node to have multiple upstream connections and data paths at a given time. For example, a restriction to a single upstream connection may prevent and/or eliminate data storms, data packet misdirection, constant and complex updating of routing lists, and a need for centralized network control.

In certain embodiments, all data transmissions may be required to pass through an upstream node that is common to endpoints of data transmissions. Such an upstream node may be referred to as a "common upstream node." Hence, nodes 106 may not exchange data transmissions directly with one another without passing through a common upstream node. For example, in order for node 106-4 to deliver a data transmission to node 106-6, the data transmission will first be transmitted and retransmitted by nodes 106-4, 106-3, 106-2, and 106-1 such that the data transmission travels to gateway node 104 along data transmission path 112. In this example, gateway node 104 is the common upstream node for nodes 106-3 and 106-6. Gateway node 104 may receive and redirect the data transmission downstream toward node 106-6 such as by broadcasting the data transmission to all nodes 106 within wireless transmission range. Nodes 106-5 may receive and retransmit the downstream data transmission until node 106-6 receives, decodes, and utilizes the data transmission. By ensuring that all data transmissions pass through a common upstream node (such as gateway node 104 in the above-described example), system 100 may provide a secure dynamic wireless network environment. Moreover, one or more processes for dynamically controlling the configuration of nodes 102 within system 100 and/or routing data transmissions within system 100 may be simplified as compared to a network that allows direct data transmissions between non-gateway nodes 106.

As shown in FIG. 1, gateway node 104 may have a connection 114 to an established network 116. Accordingly, gateway node 104 may function as a gateway to/from the established network 116, and nodes 106 may transmit and/or receive communications to/from the established network 116 via gateway node 104. The established network 116 may include any existing network such as the Internet, an intranet, a land-based network, a wide area network, a local area network, a mobile phone network, a media network (e.g., a subscriber television network), a backhaul network, a core network, an optical fiber network, and any other existing network to which gateway node 104 may provide access. In certain embodiments, for example, the established network 116 may include the Internet, and gateway node 104 may be configured to provide nodes 106, which may include mobile devices located on the open ocean in some examples, with access to the Internet.

In certain examples, one or more nodes 106 may be configured to function as gateway nodes such as gateway node 104 when direct access to the established network 116 is available to the nodes 106. For example, node 106-6 may determine that direct access is available to the established network 116 via a modem included in or otherwise connected to node 106-6. In response, node 106-6 may transition to a gateway node. In response, the configuration of system 100 in FIG. 1 may be automatically reconfigured (e.g., optimized) based on node 106-6 functioning as a gateway node.

A gateway node such as gateway node 104 may be configured to regulate network throughput to one or more downstream-connected nodes 106. For example, a gateway node may select and apply a network throughput threshold limiter to place an upper bound on network throughput. As a configuration of downstream-connected nodes 106 elongates away from gateway node 104, gateway node 104 may reduce network throughput such as by changing the network throughput threshold limiter accordingly. Nodes 106 may also be configured to regulate network throughput to one or more downstream-connected nodes 106.

Each node in the plurality of nodes 102 may be configured to assign itself a "node status," which may indicate a position, role, and/or function of the node in system 100. In certain embodiments, the node status may be selected from a set of node statuses comprising an "isolated" node status, a "terminal" node status, an "intermediate" node status, and a "gateway" node status. An isolated node status may indicate that a node does not have a connection (direct or indirect) to a gateway node such as gateway node 104. A terminal node status may indicate that a node is at an endpoint of a branch of one or more nodes branching from a gateway node such as gateway node 104. In other words, a terminal node does not have any downstream connections to other nodes. In FIG. 1, nodes 106-4 and 106-6 are terminal nodes located at endpoints of branches from gateway node 104. An intermediate node status may indicate that a node has both an upstream connection to another node and at least one downstream connection to one or more other nodes. In FIG. 1, nodes 106-1, 106-2, 106-3, and 106-5 are intermediate nodes. A gateway node status may indicate that a node has a connection to an established network, such as established network 116, and is configured to function as a gateway to the established network. In FIG. 1, gateway node 104 is the sole gateway node to established network 116.

Each node within the plurality of nodes 102 may be configured to set a flag indicating a status of the node. In certain embodiments, data representative of the status flag may be exchanged between nodes 102 via network control protocol messages and used to perform one or more connectivity operations.

As mentioned, connections 110 may be selectively established, maintained, terminated, reconfigured, and/or optimized to interconnect nodes 102 and form data transmission paths in a way that is optimal for sending and/or receiving communications to/from gateway node 104. For example, each node 102 may be configured to automatically optimize its upstream connection and/or data transmission path to gateway node 104. In certain embodiments, establishment, maintenance, termination, reconfiguration, and/or optimization of connections 110 between nodes 102 may be selectively performed by nodes 102 based on telemetry data that is exchanged between nodes 102.

Telemetry data may include any data that is descriptive of nodes 102 and/or relationships of nodes 102 within system 100 and that may be used to dynamically and selectively establish, maintain, terminate, reconfigure, and/or optimize connections 110 between nodes 102. In certain implementations, for example, telemetry data may include data such as an indicator indicating whether a node 102 has a connection to a gateway node such as gateway node 104, data indicating a number of hops from the node 102 to a gateway node such as gateway node 104, and a downstream node count associated with node 102 (e.g., a count indicating a number of downstream nodes 102 served by the node 102 or by another node 102 upstream of the node 102). The number of hops from a node 102 to a gateway node may be referred to a "hop count," and the number of downstream nodes 102 served by a node 102 may be referred to as a "node count." In the example shown in FIG. 1, telemetry data for gateway node 104 may indicate that gateway node 104 has a connection to gateway node 104 (in this case the connection is self-contained within gateway node 104), that gateway node 104 is zero hops away from gateway node 104, and that gateway node 104 serves six downstream nodes 102 (i.e., nodes 106-1 through 106-6). As another example, telemetry data for node 106-1 may indicate that node 106-1 has a connection to gateway node 104 (via connection 110-1), that node 106-1 is one hop away from gateway node 104 (i.e., connection 110-1 counts as one hop), and that node 106-1 serves three downstream nodes (i.e., nodes 106-2, 106-3, and 106-4). As yet another example, telemetry data for node 106-4 may indicate that node 106-4 has a connection to gateway node 104 (via data transmission path 112), that node 106-4 is four hops away from gateway node 104 (i.e., connections 110-1, 110-2, 110-3, and 110-4 each count as one hop), and that node 106-4 serves zero downstream nodes (i.e., node 106-4 is a terminal node).

Telemetry data may be exchanged between nodes 102 in any suitable way. In certain embodiments, telemetry data may be exchanged directly between nodes 102 that are positioned proximate to one another in system 100. As used herein, nodes 102 that are positioned proximate to one another may include any nodes 102 that are within wireless transmission range of one another and/or that are connected by a connection 110. Such nodes 102 may be referred to as "locally proximate" nodes 102, "proximate" nodes 102, or "in-range" nodes 102.

In certain implementations, proximate nodes 102 that are within wireless transmission range of one another may be configured to exchange messages containing telemetry data. The exchanges may be performed periodically and/or in response to one or more predetermined events. For example, a node 102 may be configured to periodically broadcast a beacon message to establish an initial handshake with any other node 102 within wireless transmission range of the node 102, including any other node 102 that has moved within wireless transmission range of the node 102. Any other nodes 102 within wireless transmission range of the node 102 may receive and respond to the beacon message. The node 102 may receive one or more responses to the beacon message. In certain examples, the beacon message and/or responses to the beacon message may be referred to as handshaking messages that contain telemetry data that is exchanged between nodes 102. Additionally or alternatively, one or more other messages between nodes 102 may contain telemetry data for the nodes 102. In this or another manner, proximate nodes 102 may exchange telemetry data periodically and/or in response to one or more predetermined events via network control protocol messages exchanged between the nodes 102. Examples of predetermined events that may trigger exchange of telemetry data may include a change in a status of a node 102 within system 100 such as establishment, reconfiguration, termination, and/or optimization of a connection 110 associated with the node 102.

Additionally or alternatively, telemetry data may be exchanged via data transmissions between nodes 102 interconnected by a connection 110. For example, gateway node 104 may transmit a data transmission to node 106-1 (and any other nodes 106 located within wireless transmission range). Before transmitting the data transmission, gateway node 104 may insert telemetry data for gateway node 104 in the data transmission. Node 106-1 may be configured to receive and to strip the telemetry data from the data transmission. If node 106-1 determines that the data transmission should be retransmitted downstream, node 106-1 may insert telemetry data for node 106-1 in the data transmission and transmit it to node 106-2 (and any other nodes 106 located within wireless transmission range of node 106-1). In this or a similar manner, telemetry data may be exchanged between nodes 102 via data transmissions.

Figure 2:
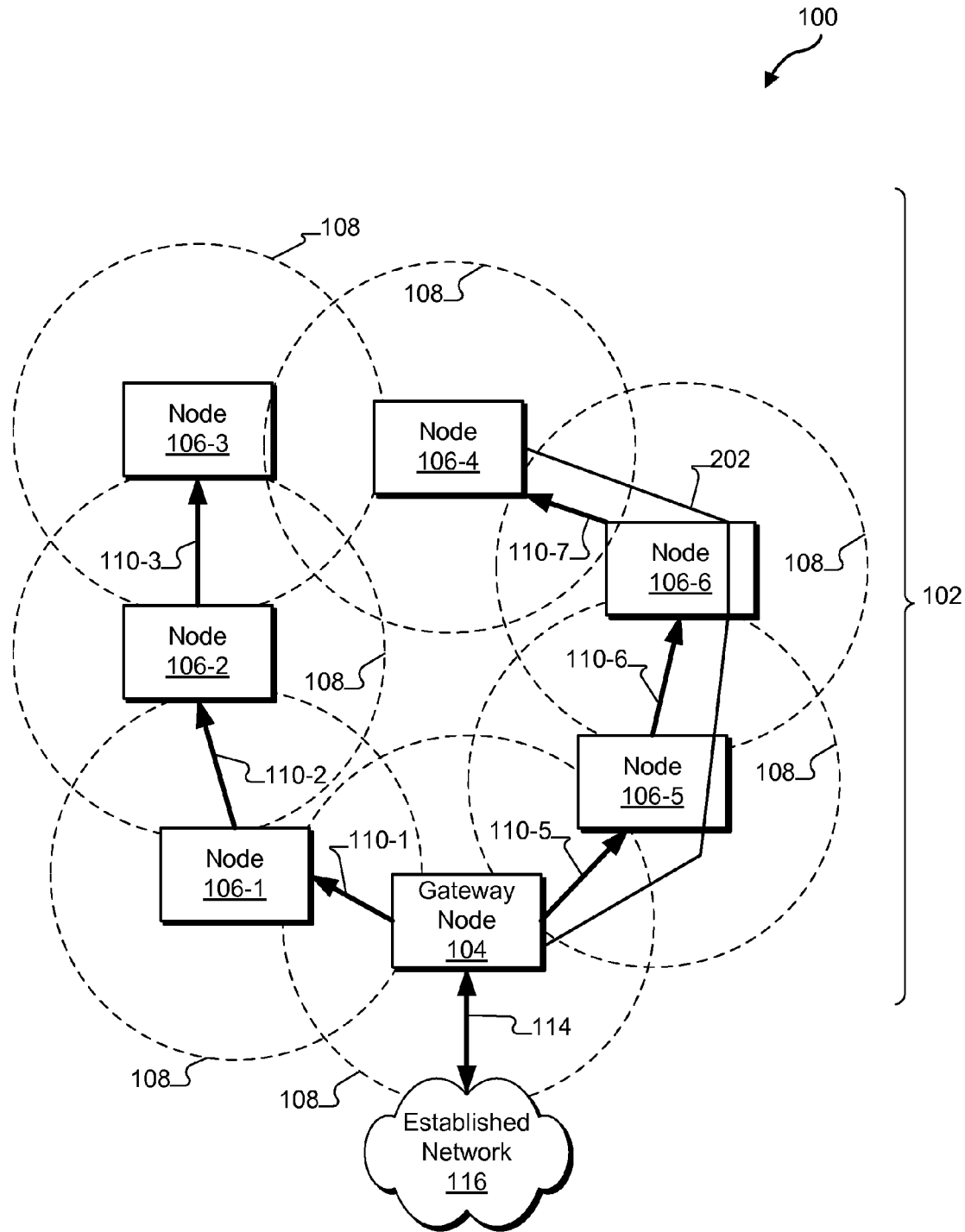
FIG. 2 illustrates another configuration of the exemplary dynamic wireless network system of FIG. 1.

As mentioned, FIG. 1 illustrates a snapshot view of a configuration of system 100 at a given time. Inasmuch as nodes 102 and connections 110 may be dynamic in nature, as described herein, other configurations of nodes 102 and connections 110, and consequently system 100, may be dynamically and selectively formed. Hence, the configuration of nodes 102 and connections 110 in system 100 may change dynamically and automatically over time based on changing attributes of nodes 102 and/or connections 110. For example, one or more nodes 106 may include mobile devices that may change geographic locations, which change may trigger dynamic reconfigurations of the configuration of system 100. To illustrate, FIG. 2 shows another snapshot view of a configuration of system 100 in which node 106-4 has changed geographic position such that node 106-4 is now located within wireless transmission range of nodes 106-3 and 106-6. Node 106-4 may be configured to dynamically analyze and reconfigure its upstream connection 110-4 in a way that optimizes the data transmission path from node 106-4 to gateway node 104. To this end, when node 106-4 is within wireless transmission range of nodes 106-3 and 106-6 as shown in FIG. 2, telemetry data may be exchanged between node 106-4 and nodes 106-3 and 106-6. For example, node 106-4 may transmit a beacon message. Nodes 106-3 and 106-6 may receive and respond to the beacon message such that telemetry data is exchanged.

Based on the exchanged telemetry data, node 106-4 may analyze its upstream connection 110-4 that provides a data transmission path to gateway node 104 as compared to any other available upstream connection(s) that can provide path(s) to gateway node 104. For example, node 106-4 may determine, based on the exchanged telemetry data that node 106-3 continues to have a connection to a gateway node and that node 106-6 also has a connection to a gateway node. Thus, both nodes 106-3 and 106-6 are viable options for establishing a path to a gateway node. Node 106-4 may then determine, based on a comparison of the exchanged telemetry data, which of nodes 106-3 and 106-6 has a more favorable connection path to a gateway node. In some examples, this determination may be based on a comparison of the number of hops from each of the nodes 106-3 and 106-6 to a gateway node. In the illustrated example, node 106-3 is three hops from gateway node 104, and node 106-6 is two hops from gateway node 104. Accordingly, node 106-4 may determine that node 106-6 has a more favorable connection path (e.g., fewer hops) to a gateway node than node 106-3. In certain embodiments, node 106-4 may be configured to automatically reconfigure its upstream connection 110-4 to connect to the node 106-6 with the more favorable connection path to a gateway node. To this end, connection 110-4 may be terminated between nodes 106-3 and 106-4 and a new connection 110-7 established between nodes 106-4 and 106-6, as shown in FIG. 2. Consequently, a new data transmission path 202 between node 106-4 and gateway node 104 may be formed by connections 110-5, 110-6, and 110-7 as shown in FIG. 2. The above-described example of reconfiguring nodal interconnections within system 100 is just one example of the many ways that connections 110 may be dynamically, automatically, and selectively established, maintained, terminated, reconfigured, and/or optimized to form data transmission paths in a way that is designed to optimize paths to and/or communications with a gateway node such as gateway node 104.

In the event that the lowest number of hops to a gateway node is identical for nodes that are potential upstream connections for a node, other telemetry data may be used to select an optimal upstream connection. In certain embodiments, for example, a node may be configured to compare the node counts associated with the potential upstream connection nodes and to select the node with the lowest node count. For instance, one potential upstream connection node may be a terminal node with a node count of "zero" indicating that the node does not serve any downstream nodes, and another potential upstream connection node may have a node count of "one" indicating that the other node serves one downstream node. The node analyzing potential upstream connections may automatically select and establish an upstream connection 110 to the first potential upstream connection node based on a comparison of the node counts and/or other quantifiable telemetry data to determine that the first potential upstream connection node is associated with a relatively lower node count.

In the event that the node counts for potential upstream connection nodes are identical, one or more other conditions may be used as a tiebreaker. For example, an existing upstream connection may be maintained when there is no determinable advantage (e.g., a lower hop count and/or node count is not available) to reconfigure the existing upstream connection.

By selectively performing one or more network connectivity operations based on an analysis of exchanged telemetry data in any of the ways described herein, system 100 may dynamically establish, maintain, terminate, reconfigure, and/or optimize nodal interconnections in a way that forms a dynamic wireless network configuration that promotes load balancing with relatively low overhead. For example, by selectively configuring nodal interconnections based on hop counts and/or node counts as described herein, load balanced network configurations may be dynamically established and maintained.

In certain embodiments, each node within the plurality of nodes 102 may be configured to perform one or more of the processes described herein independently of other nodes within the plurality of nodes 102 and without being controlled or directed by a master controller. For example, each node may be configured to independently make and/or control connectivity and/or routing decisions and processes. To illustrate, each node in system 100 may be configured to analyze and utilize exchanged telemetry data to selectively, dynamically, and independently establish, maintain, terminate, reconfigure, and/or optimize an upstream connection and/or a data transmission path to gateway node 104 as described herein. Such nodal independence may produce scalability of system 100 such that system 100 may be implemented and operated at a small, medium, or large scale, with relatively low costs and maintenance requirements as compared to conventional mobile access networks.

In certain examples, a node within the plurality of nodes 102 may be configured to maintain exchanged telemetry data only for locally proximate nodes such that the node has a view of only a localized topology within system 100. By being configured to operate and make connectivity and/or routing decisions based on telemetry data representative of a local topology within system 100, the node may successfully operate within its own local sphere without having to maintain data for a wider network topology or communicate with a master controller. Accordingly, each node may be configured to operate on a localized basis within system 100 in a way that conserves resources and that is conveniently scalable and adaptable to changes within system 100.

Figure 3:
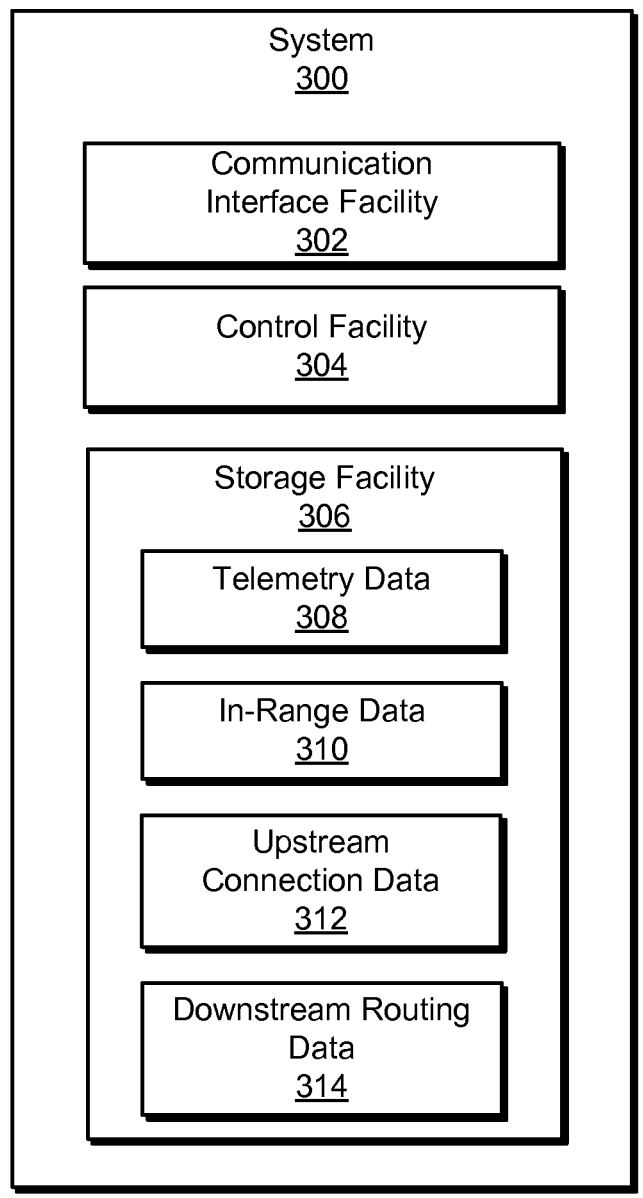
FIG. 3 illustrates an exemplary dynamic wireless network node system.

FIG. 3 illustrates an exemplary node system 300 (or simply "system 300"). System 300 may be configured to perform one or more of the nodal processes described herein. For example, system 300 may be implemented by any of the plurality of nodes 102 within system 100 and configured to perform one or more operations of nodes 102 described herein.

As shown in FIG. 3, system 300 may include, but is not limited to, a communication interface facility 302 (or simply "interface facility 302"), a control facility 304, and a storage facility 306, which may be in communication with one another using any suitable communication technologies. It will be recognized that although facilities 302-306 are shown to be separate facilities in FIG. 3, any of those facilities may be combined into a single facility as may serve a particular implementation. Facilities 302-306 will now be described in more detail.

Interface facility 302 may be configured to facilitate wireless communications with one or more devices, including one or more wireless-network-enabled devices implementing nodes 102 of system 100. For example, interface facility 302 may include a wireless transceiver and/or amplifier (e.g., a baseband amplifier) configured to transmit and receive wireless communication signals.

In certain embodiments, interface facility 302 may be configured to provide a connection to an established network such as established network 116. For example, interface facility 302 may include a modem configured to provide a connection to an established network such as the Internet. This may allow system 300 to function as a gateway to the established network when a connection to the established network can be formed.

Control facility 304 may be configured to control, perform, and/or initiate one or more nodal operations described herein, including one or more of the telemetry exchange, connectivity, and/or data routing operations described herein. For example, control facility 304 may be configured to maintain and exchange telemetry data, and to analyze and utilize exchanged telemetry data 308 to selectively and dynamically establish, maintain, reconfigure, terminate, and/or optimize connections between nodes 102 within system 100. In addition, control facility 304 may be configured to maintain routing data and to selectively route data transmissions based on the routing data. Control facility 304 may include one or more heuristics configured to direct, initiate, perform, and/or otherwise control one or more of the nodal processes described herein.

Storage facility 306 may be configured to store electronic data, including any of the data mentioned herein. As shown in FIG. 3, storage facility 306 may store telemetry data 308, in-range data 310, upstream connection data 312, and downstream routing data 314. Telemetry data 308 may include any of the telemetry data described herein, including telemetry data for a node implementing system 300. For instance, telemetry data 308 may include an indicator indicating whether the node has a connection path to a gateway node, a hop count indicating the number of hops from the node to the gateway node, and a node count indicating the number of downstream nodes served by the node. In addition, telemetry data 308 may include exchanged telemetry data that has been received from one or more other nodes located within wireless transmission range of the node. Hence, telemetry data 308 may include data representative of a local topology of locally proximate nodes within system 100.

In-range data 310 may include data representative of one or more nodes located within wireless transmission range of the node implementing system 300. For example, in-range data 310 may include a list of identifiers (e.g., unique machine addresses) indicating one or more nodes that are located within wireless transmission range of the node implementing system 300. In certain examples, in-range data 310 may be populated based on handshaking messages received from in-range nodes.

Upstream connection data 312 may include data indicating an upstream connection from the node implementing system 300 to another node. For example, upstream connection data 312 may include a unique machine address for the upstream node to which the node implementing system 300 has a direct connection.

Routing data 314 may include data representative of one or more downstream nodes that are directly or indirectly served by the node implementing system 300. Control facility 304 may be configured to use routing data 314 to selectively route data transmissions downstream. For example, the node implementing system 300 may receive a downstream-directed data transmission targeted to another node within system 100. Control facility 304 may determine whether the targeted node is represented in routing data 314. If the targeted node is represented in routing data 314, control facility 304 may initiate a retransmission of the data transmission such as by broadcasting the data transmission to all nodes located within wireless transmission range of the node implementing system 300. On the other hand, if the targeted node is not represented in routing data 314, control facility 304 may refrain from initiating a retransmission (e.g. a broadcast) of the data transmission.

System 300, including facilities 302-306, may include any computer hardware and/or computer-implemented instructions (e.g., software), or combinations of computer-implemented instructions and hardware, configured to perform one or more of the nodal processes described herein. In particular, system 300 may be implemented on one physical computing device or may be implemented on more than one physical computing device. Accordingly, system 300 may include and/or be implemented by any number of computing devices (e.g., network devices).

Accordingly, one or more of the processes described herein may be implemented at least in part as instructions executable by one or more computing devices. In general, a processor (e.g., a microprocessor) receives instructions, from a computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, a DVD, any other optical medium, a RAM, a PROM, an EPROM, a FLASH-EEPROM, any other memory chip or cartridge, or any other medium from which a computer can read.

Figure 4:
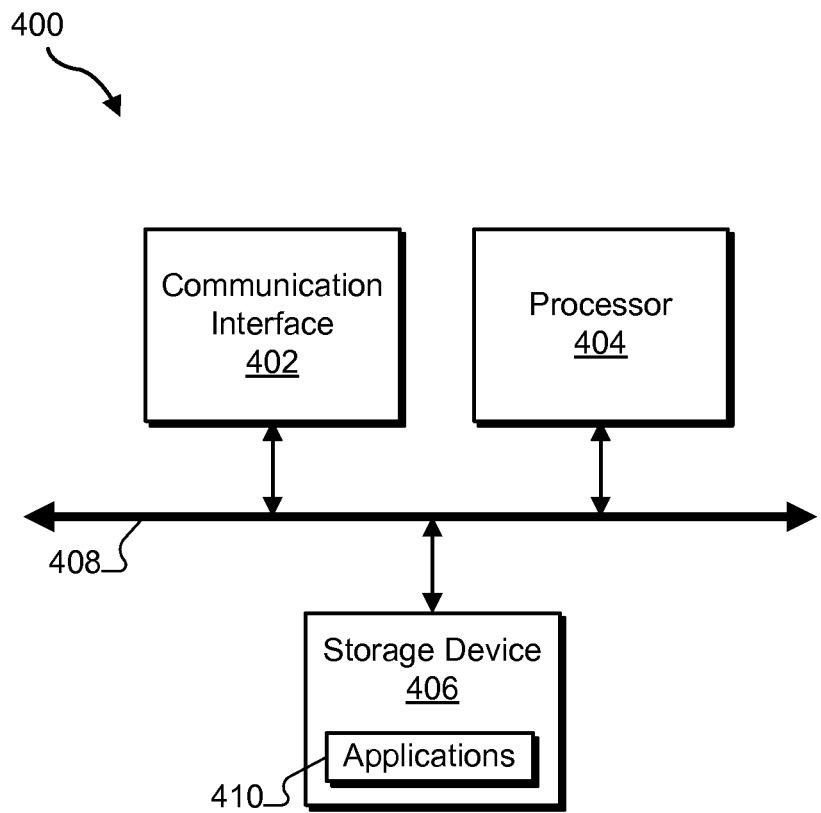
FIG. 4 illustrates an exemplary wireless-network-enabled device implementing the system of FIG. 3.

FIG. 4 illustrates an exemplary wireless-network-enabled device 400 (or simply "device 400") implementing system 300. As shown, device 400 may include a communication interface 402, a processor 404, and a storage device 406 communicatively coupled one to another via a communication infrastructure 408. The components of device 400 may communicate with one another, including sending data to and receiving data from one another, using any suitable communication technologies. Moreover, the components of device 400 may be implemented on any wireless-network-enabled computing device, telecommunications device, repeater device, or the like. In certain embodiments, for example, device 400 may include a mobile device such as a mobile end-user device (e.g., a mobile phone device or a vehicular device).

While an exemplary device 400 is shown in FIG. 4, the components illustrated in FIG. 4 are not intended to be limiting. Additional or alternative components may be used in other embodiments. Components of the device 400 shown in FIG. 4 will now be described in additional detail.

Communication interface 402 may be configured to facilitate wireless communications with one or more devices, including one or more wireless-network-enabled devices. For example, communication interface 402 may include a wireless network interface (such as a wireless network interface card, a transceiver, an amplifier, etc.) configured to transmit and receive wireless communication signals. Communication interface 402 may be configured to utilize any suitable communication protocols, formats, and/or technologies to provide an interface for wireless communications with other devices.

In certain embodiments, communication interface 402 may be configured to provide a connection to an established network such as established network 116. For example, communication interface 402 may include a modem configured to provide a connection to an established network such as the Internet. This may allow device 400 to function as a gateway to the established network when a connection to the established network can be formed.

Processor 404 generally represents any type or form of processing unit capable of processing data or interpreting, executing, and/or directing execution of one or more of the instructions, processes, and/or operations described herein. Processor 404 may direct execution of operations in accordance with one or more applications 410 or other computer-executable instructions such as may be stored in storage device 406 or another computer-readable medium. As an example, processor 404 may be configured to process data, including modulating, encoding, and/or otherwise preparing data and/or wireless communication signals for transmission by communication interface 402.

Storage device 406 may include one or more data storage media, devices, or configurations and may employ any type, form, and combination of data storage media and/or device. For example, storage device 406 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 406. For example, data representative of one or more executable applications 410 configured to direct processor 404 to perform one or more of the operations described herein may be stored within storage device 406.

In some examples, interface facility 302, control facility 304, and/or storage facility 306 of system 300 may be implemented by or within one or more components of device 400. For example, one or more applications 410 residing within storage device 406 may be configured to direct processor 404 to perform one or more processes or functions associated with interface facility 302 and/or control facility 304. Likewise, storage facility 306 may be implemented by or within storage device 406. For example, telemetry data 308, in-range data 310, upstream connection data 312, and routing data 314 may be stored within storage device 406.

Figure 5:
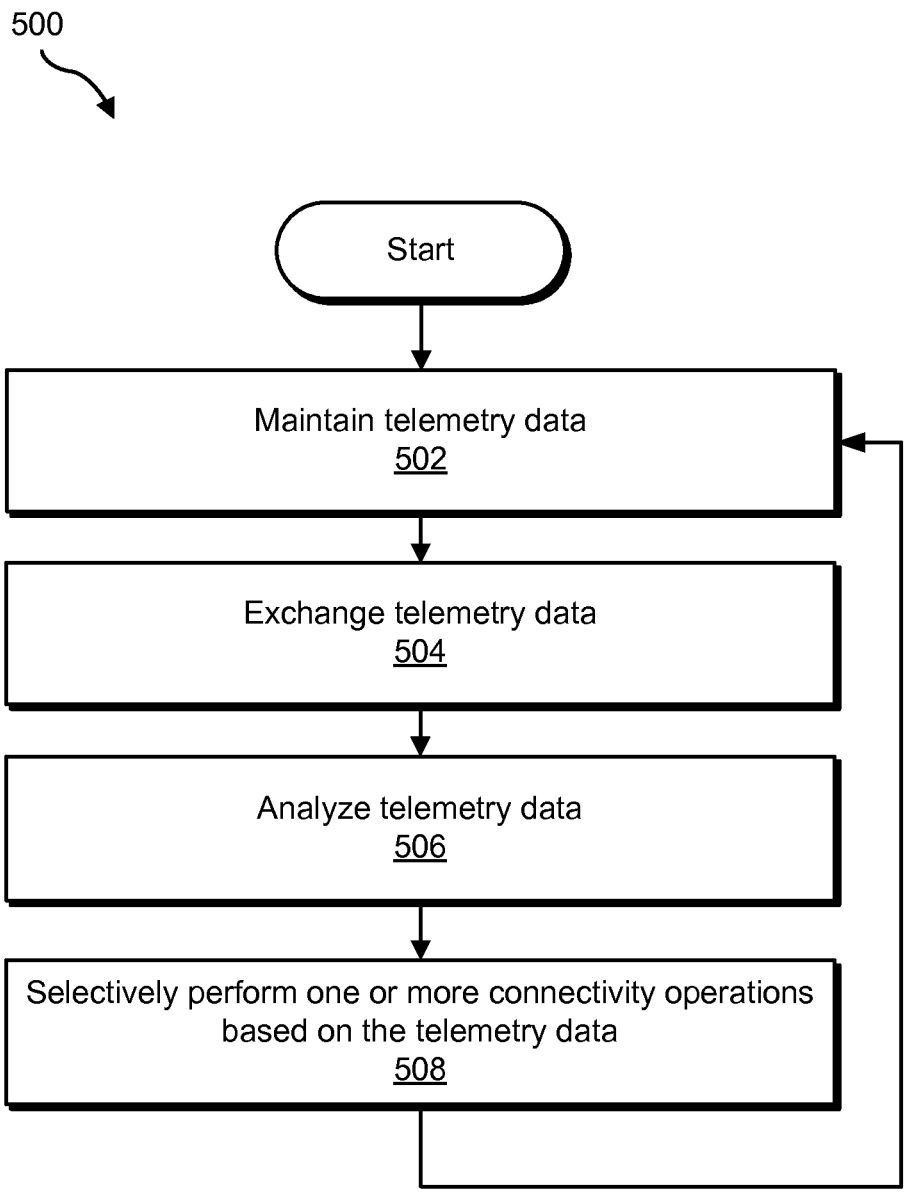
FIG. 5 illustrates an exemplary dynamic wireless networking method.

FIG. 5 illustrates an exemplary dynamic wireless networking method 500. While FIG. 5 illustrates exemplary steps according to one embodiment, other embodiments may omit, add to, reorder, and/or modify any of the steps shown in FIG. 5. In certain embodiments, one or more of the steps shown in FIG. 5 may be performed by one or more nodes 102 of system 100, one or more components of system 300, and/or one or more components of device 400.

In step 502, telemetry data is maintained. For example, device 400 implementing a node 102 within system 100 may maintain telemetry data for the node 102. The telemetry data may include any of the examples of telemetry data described herein. For example, the telemetry data may include an indicator indicating whether the node 102 has a connection path to a gateway node. If the node 102 is an isolated node, the indicator will indicate that the node 102 does not have a connection path to a gateway node. If the node is not an isolated node, the indicator will indicate that the node 102 has a connection path to a gateway node. In addition, the telemetry data may include data indicating a number of hop counts to a gateway node and a downstream node count associated with the node 102. The telemetry data for the node 102 may be determined and populated in any suitable way.

In step 504, telemetry data is exchanged. For example, telemetry data may be exchanged between proximate nodes within system 100. To illustrate, device 400 implementing a node within system 100 may transmit wireless communication signals containing telemetry data for device 400 to any other node devices located within wireless transmission range of device 400. Device 400 may also receive wireless communication signals containing telemetry data for other node devices located within wireless transmission range of device 400.

In step 506, telemetry data is analyzed. For example, telemetry data received by device 400 from one or more other node devices within wireless transmission range of device 400 may be analyzed by device 400. The analysis may include comparing telemetry data associated with various node devices. For instance, device 400 may compare telemetry data for a first nodal device to telemetry data for a second nodal device.

In step 508, one or more connectivity operations may be selectively performed based on the telemetry data. For example, in any of the ways described herein, device 400 may selectively establish, maintain, terminate, reconfigure, and/or optimize an upstream connection based on the telemetry data in a way that is designed to optimize communications with a gateway device. For instance, device 400 may identify an optimal data transmission path between device 400 and a gateway device based on exchanged telemetry data and selectively establish an upstream connection to another nodal device to form the optimal data transmission path to the gateway device.

One or more steps of method 500 may be repeated. For example, telemetry data may be exchanged periodically and/or in response to a predetermined event such that updated telemetry data is shared between locally proximate nodes. Received, updated telemetry data may be analyzed and utilized to selectively perform one or more connectivity operations. In this or a similar manner, the repetition of one or more steps of method 500 may serve to dynamically configure and/or reconfigure inter-nodal connections and data transmission paths over time to generate and/or maintain optimal data transmission paths to one or more gateway nodes based on up-to-date, refreshed telemetry data. In FIG. 5, after completion of step 508, processing may return to step 502 in which telemetry data may be updated based on the performance of one or more connectivity operations in step 508. The updated telemetry data may be exchanged in step 504 and so on such that the steps of method 500 may be repeated to continually and dynamically configure and reconfigure inter-nodal connections and data transmission paths over time.

Several examples of connectivity operations that may be dynamically and selectively performed will now be described. FIGS. 6A-6F illustrate a dynamic establishment of a configuration of a wireless network system 600 (or simply "system 600"). The example shown in FIGS. 6A-6F is illustrative only. Other dynamic configurations of wireless network system 600 may be formed in other examples.

Figure 6A:
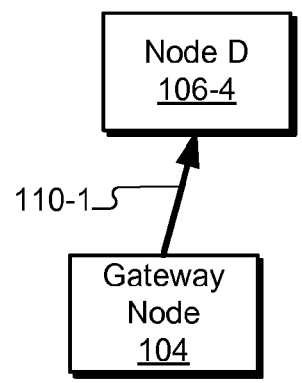
FIGS. 6A-6F illustrate a dynamic expansion of a wireless network system.

In FIG. 6A, a gateway node 104 is configured to provide a connection to an established network. Another node 106-4 ("Node D") is located within wireless transmission range of gateway node 104. Gateway node 104 and Node D may exchange handshaking messages. For example, gateway node 104 may broadcast a beacon message. Node D may receive and respond to the beacon message. Through the exchange of handshaking messages, gateway node 104 and Node D may each determine that the other node is located within wireless transmission range and may update in-range data 310 accordingly. For example, gateway node 104 may add data representative of Node D to an in-range list maintained by gateway node 104, and Node D may add data representative of gateway node 104 to an in-range list maintained by Node D.

Through the above-described handshaking messages and/or subsequently exchanged messages, gateway node 104 and Node D may exchange telemetry data. Based on the telemetry data, Node D may ascertain that gateway node 104 has a connection to a gateway to an established network. In response, Node D may dynamically establish a connection 110-1 to gateway node 104. To this end, Node D may update upstream connection data 312 maintained by Node D to indicate that gateway node 104 is an immediately upstream connection of Node D. Node D may also update telemetry data 308 with telemetry data for Node D. For example, telemetry data 308 for Node D may be updated to indicate that Node D has a connection path to a gateway, the number of hops (e.g., one hop) from Node D to the gateway, and the number of downstream nodes (e.g., zero nodes) served by Node D. Gateway node 104 may also update telemetry data 308 and routing data 314 maintained by gateway node 104. For example, data representative of Node D may be added to a routing list, and the node count representing the number of nodes served by gateway node 104 may be incremented to represent that gateway node 104 serves Node D.

Table 1 depicts in-range lists, routing lists, and telemetry data as may be maintained by gateway node 104 and Node D when system 600 is configured as shown in FIG. 6A. In Table 1 and subsequently referenced tables, "GW Node" or "GW" refers to gateway node 104, a sole capital letter refers to a correspondingly labeled node (e.g., "D" refers to Node D), and "Null" refers to a data character indicating an empty list. In Table 1, for example, the in-range list for gateway node 104 indicates that Node D is located within wireless transmission range, and the routing list for gateway node 104 indicates that Node D is connected downstream of gateway node 104 in the configuration shown in FIG. 6A. The telemetry data for gateway node 104 indicates that gateway node 104 has a connection to a gateway (to itself in this case), a hop count of "zero," and a node count of "one." For Node D, the in-range list indicates that gateway node 104 is located within wireless transmission range, the routing list indicates that no nodes are connected downstream of Node D (i.e., Node D is a terminal node), and the telemetry data indicates that Node D has a connection path to a gateway, a hop count of "one," and a node count of "zero."

TABLE 1

| Node | In-Range List | Routing List | GW | Hop Count | Node Count |
|---|---|---|---|---|---|
| GW Node | D | D | Yes | 0 | 1 |
| Node D | GW | Null | Yes | 1 | 0 |

Figure 6B:
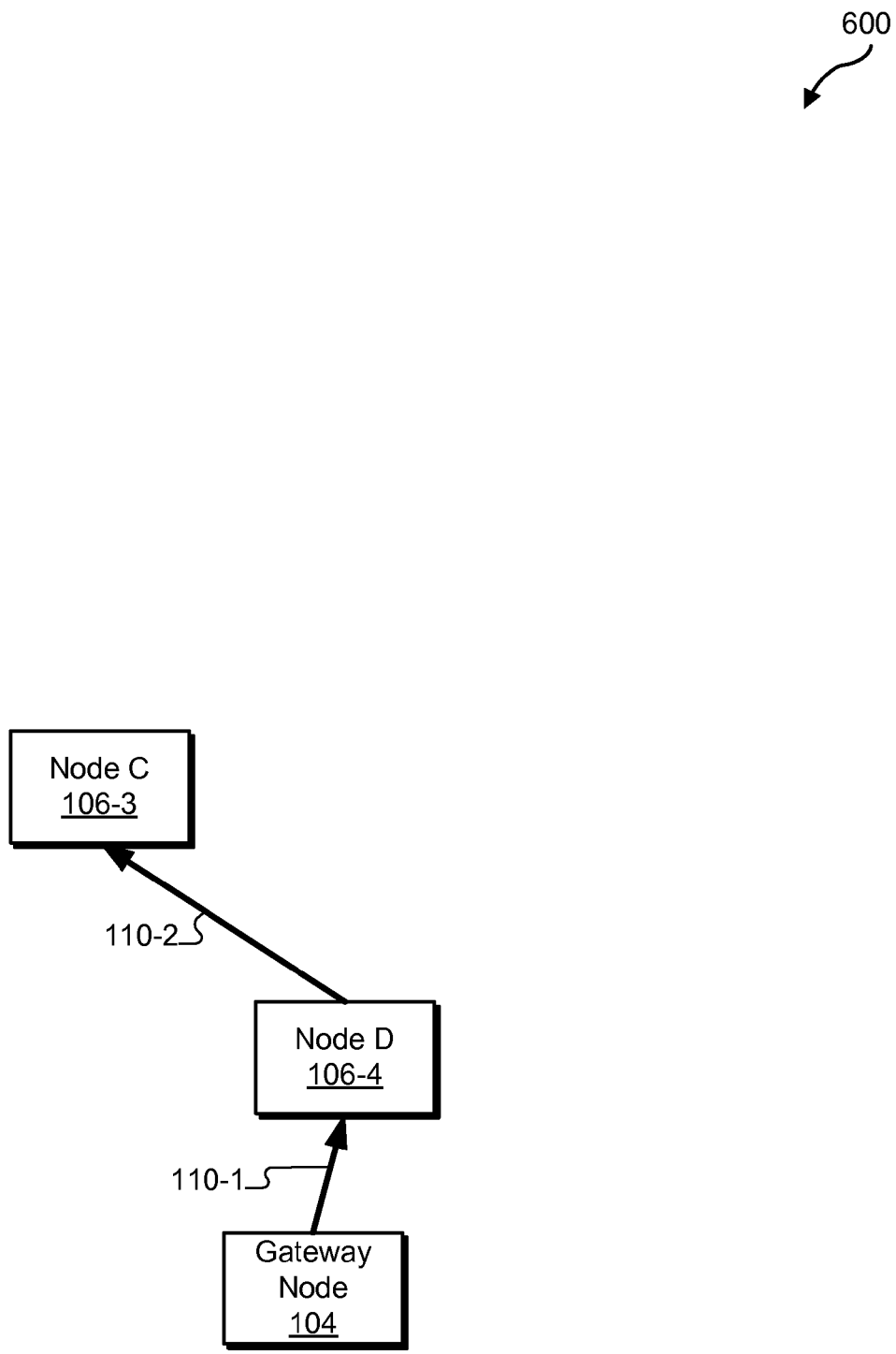

FIG. 6B shows another configuration of system 600. A node 106-3 ("Node C") may enter within wireless transmission range of Node D. One or more steps similar to those described above may be performed to exchange telemetry data and to dynamically and selectively establish a connection 110-2 between Node C and Node D based on the telemetry data. Node C, Node D, and gateway node 104 may each update data maintained by the respective node to reflect the configuration shown in FIG. 6B. Table 2 depicts data as may be maintained by gateway node 104, Node D, and Node C when system 600 is configured as shown in FIG. 6B.

TABLE 2

| Node | In-Range List | Routing List | GW | Hop Count | Node Count |
|---|---|---|---|---|---|
| GW Node | D | D, C | Yes | 0 | 2 |
| Node D | GW, C | C | Yes | 1 | 1 |
| Node C | D | Null | Yes | 2 | 0 |

Figure 6C:
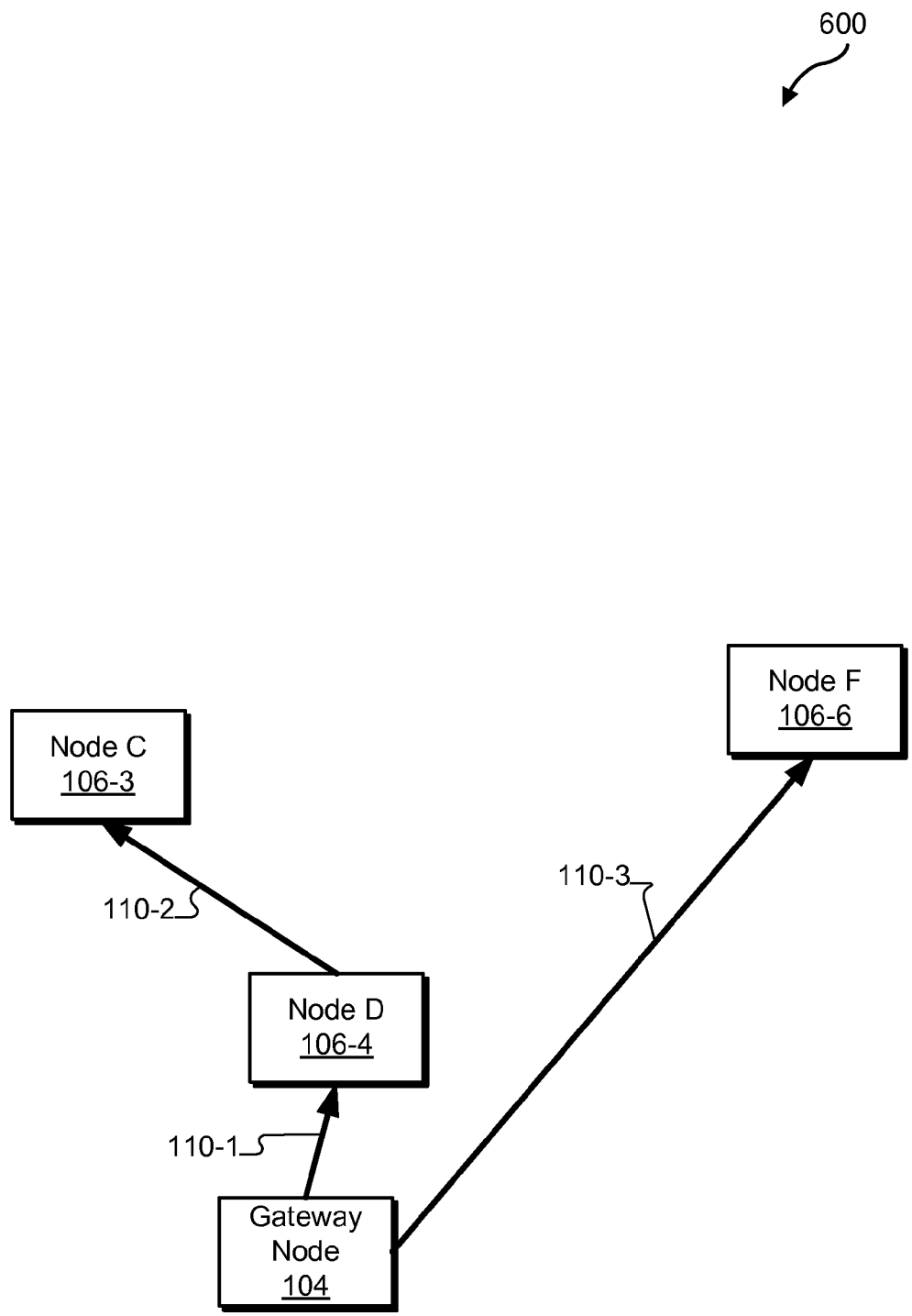

FIG. 6C shows another configuration of system 600. A node 106-6 ("Node F") may enter within wireless transmission range of gateway node 104. One or more steps similar to those described above may be performed to exchange telemetry data and to dynamically and selectively establish a connection 110-3 between Node F and gateway node 104 based on the telemetry data. Node F, Node C, Node D, and gateway node 104 may each update data maintained by the respective node to reflect the configuration shown in FIG. 6C. Table 3 depicts data as may be maintained by gateway node 104, Node D, Node C, and Node F when system 600 is configured as shown in FIG. 6C.

TABLE 3

| Node | In-Range List | Routing List | GW | Hop Count | Node Count |
|---|---|---|---|---|---|
| GW Node | D, F | D, C, F | Yes | 0 | 3 |
| Node D | GW, C | C | Yes | 1 | 1 |
| Node C | D | Null | Yes | 2 | 0 |
| Node F | GW | Null | Yes | 1 | 0 |

Figure 6D:
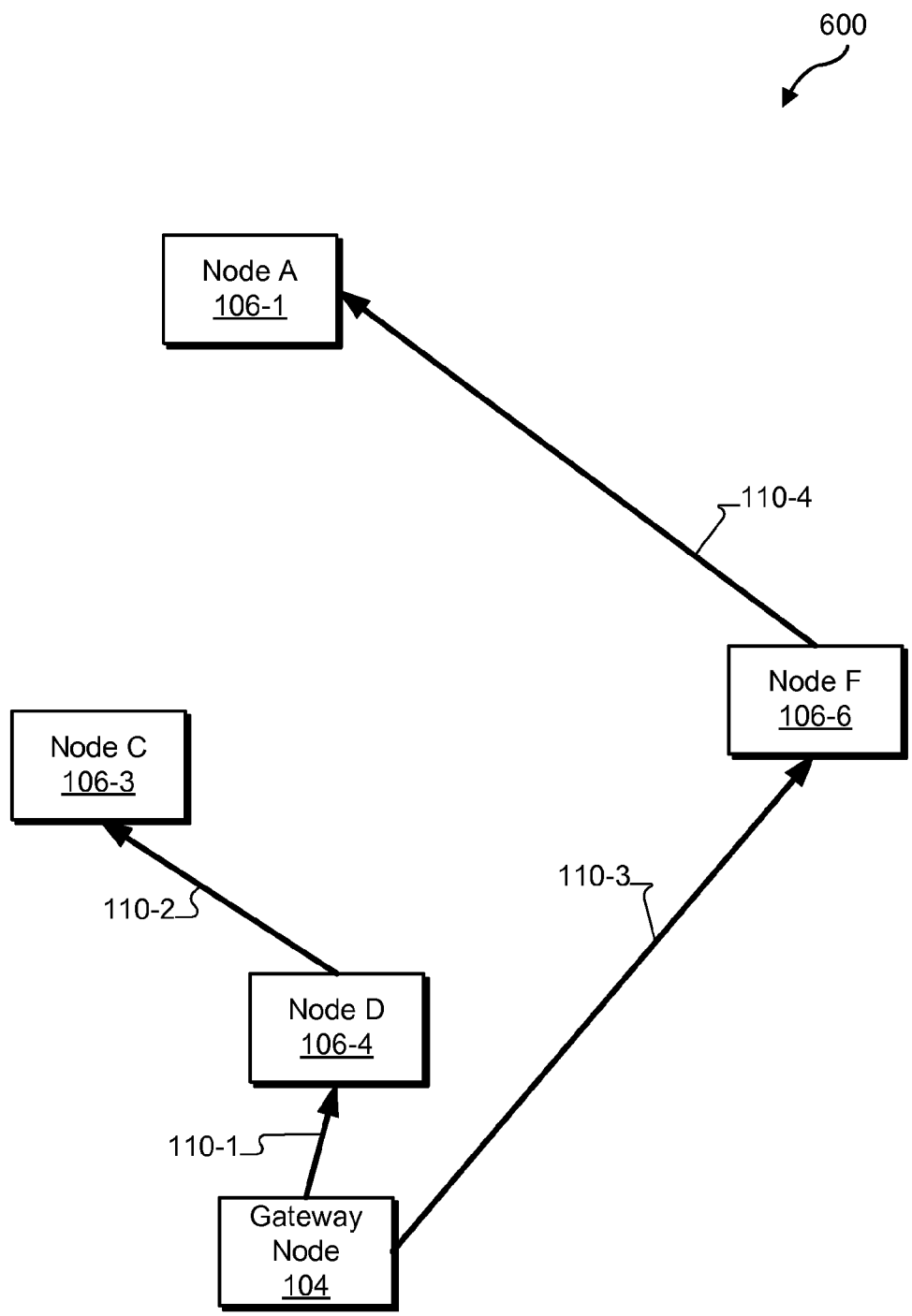

FIG. 6D shows another configuration of system 600. A node 106-1 ("Node A") may enter within wireless transmission range of Node F. One or more steps similar to those described above may be performed to exchange telemetry data and to dynamically and selectively establish a connection 110-4 between Node A and Node F based on the telemetry data. Node A, Node F, Node C, Node D, and gateway node 104 may each update data maintained by the respective node to reflect the configuration shown in FIG. 6D. Table 4 depicts data as may be maintained by gateway node 104, Node D, Node C, Node F, and Node A when system 600 is configured as shown in FIG. 6D.

TABLE 4

| Node | In-Range List | Routing List | GW | Hop Count | Node Count |
|---|---|---|---|---|---|
| GW Node | D, F | D, C, F, A | Yes | 0 | 4 |
| Node D | GW, C | C | Yes | 1 | 1 |
| Node C | D | Null | Yes | 2 | 0 |
| Node F | GW | A | Yes | 1 | 1 |
| Node A | F | Null | Yes | 2 | 0 |

Figure 6E:
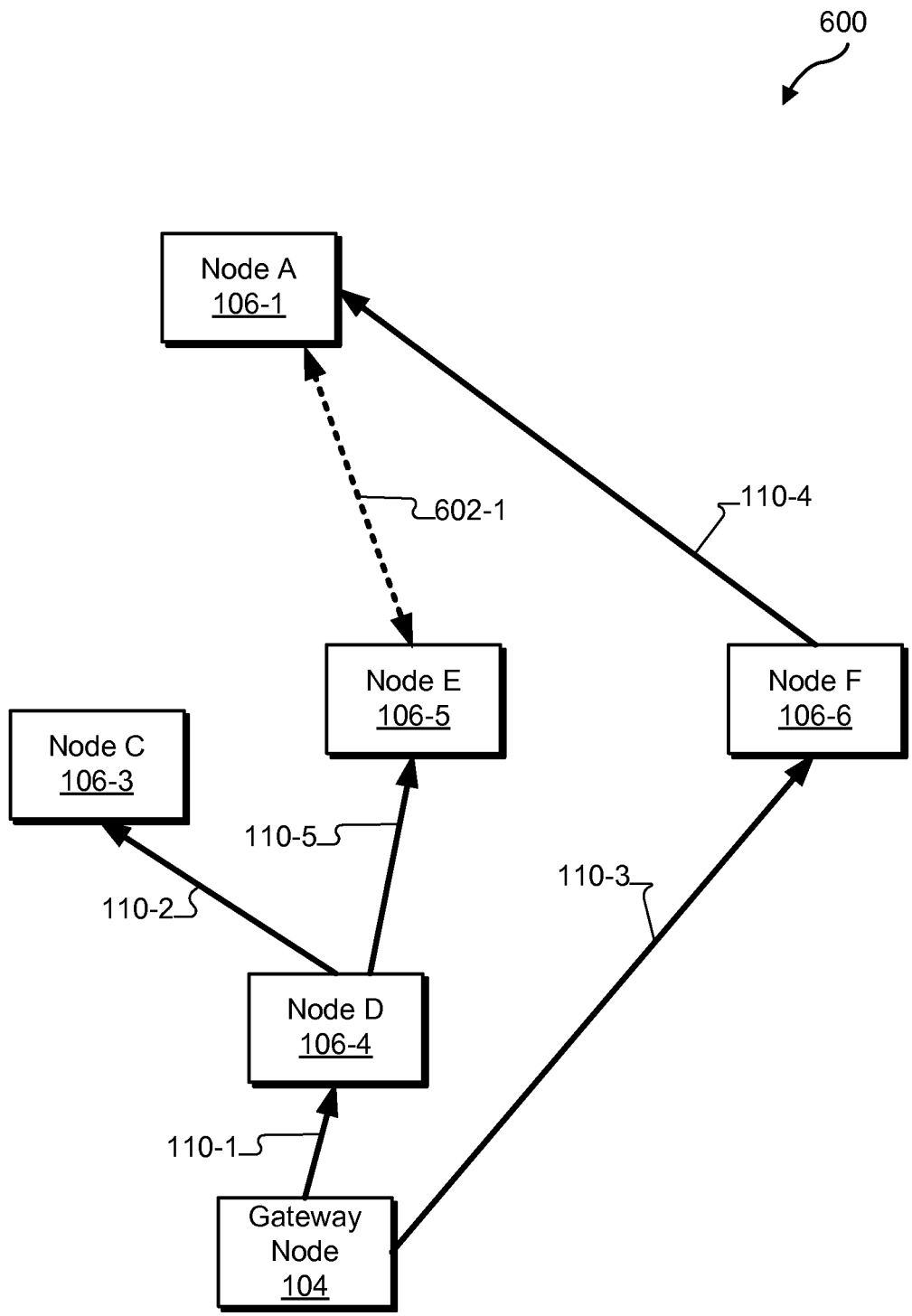

FIG. 6E shows another configuration of system 600. A node 106-5 ("Node E") may enter within wireless transmission range of Node A and Node D. One or more steps similar to those described above may be performed to exchange telemetry data and to dynamically and selectively establish a connection 110-5 between Node E and Node D based on the telemetry data. In this particular example, Node E may select to establish an upstream connection with Node D rather than Node A at least based on a comparison of the hop counts of Node D and Node A and a determination that Node D has a lower hop count than Node A. Dashed arrow 602-1 represents that Node A and Node E are located within wireless transmission range of one another but that no connection 110 has been formed between Node A and Node E. Node E, Node A, Node F, Node C, Node D, and gateway node 104 may each update data maintained by the respective node to reflect the configuration shown in FIG. 6E. Table 5 depicts data as may be maintained by gateway node 104, Node D, Node C, Node F, Node A, and Node E when system 600 is configured as shown in FIG. 6E.

TABLE 5

| Node | In-Range List | Routing List | GW | Hop Count | Node Count |
|---|---|---|---|---|---|
| GW Node | D, F | D, C, F, A, E | Yes | 0 | 5 |
| Node D | GW, C, E | C, E | Yes | 1 | 2 |
| Node C | D | Null | Yes | 2 | 0 |
| Node F | GW | A | Yes | 1 | 1 |
| Node A | F, E | Null | Yes | 2 | 0 |
| Node E | A, D | Null | Yes | 2 | 0 |

Figure 6F:
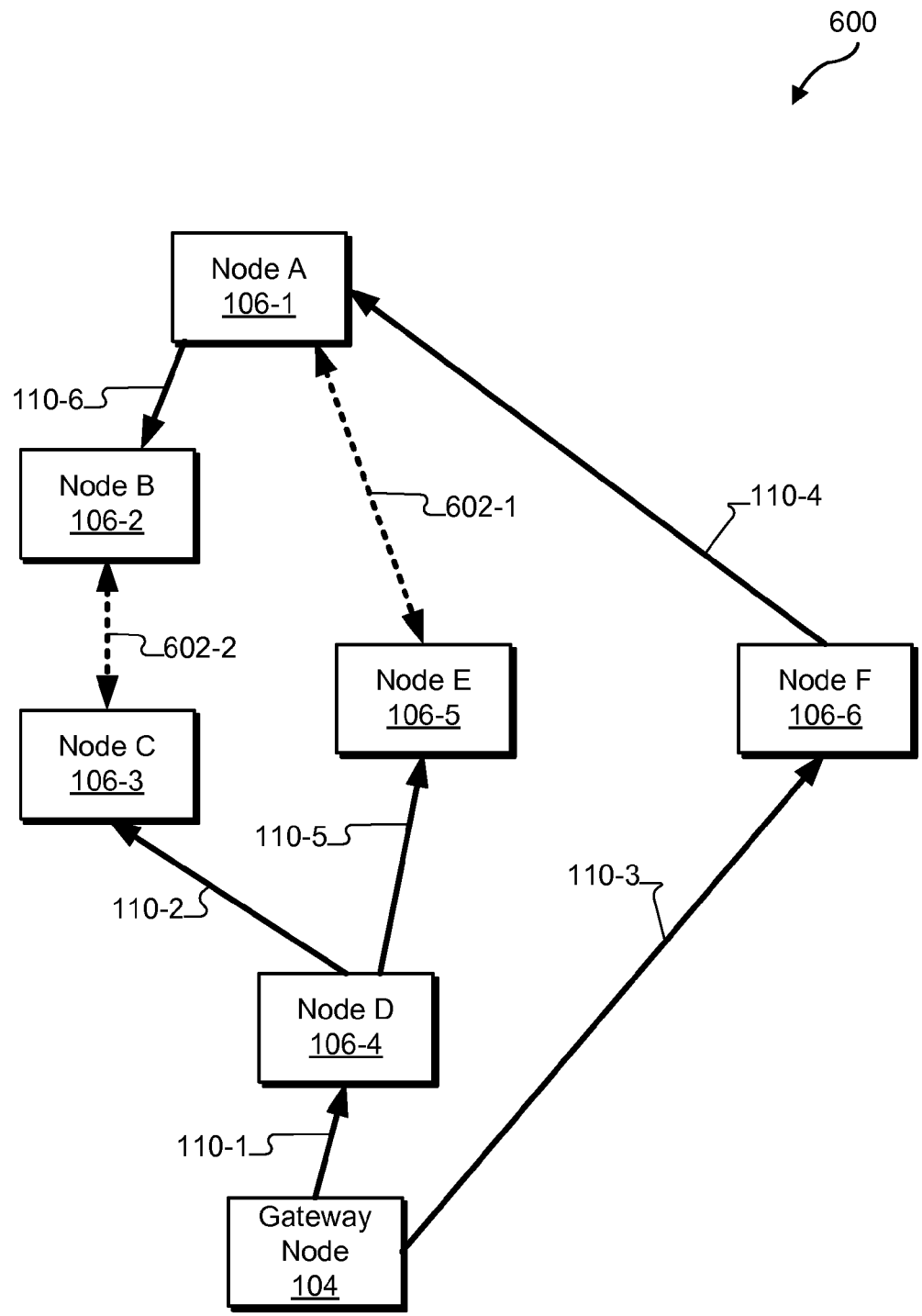

FIG. 6F shows another configuration of system 600. A node 106-2 ("Node B") may enter within wireless transmission range of Node A and Node C. One or more steps similar to those described above may be performed to exchange telemetry data and to dynamically and selectively establish a connection 110-6 between Node B and Node A based on the telemetry data. In this particular example, Node B may select to establish an upstream connection with Node A rather than Node C based at least in part on a comparison of node counts. Such a comparison may lead to a determination that Node C is part of three nodes (Node C, Node D, and Node E) of a branch from gateway node 104 and that Node A is part of two node (Node A and Node F) of another branch from gateway node 104. Accordingly, more throughput bandwidth may be available via Node A as compared to Node C. Based on this determination, Node B may select to connect to Node A rather than Node C. Dashed arrow 602-2 represents that Node B and Node C are located within wireless transmission range of one another but that no connection 110 has been formed between Node B and Node C. Node B, Node E, Node A, Node F, Node C, Node D, and gateway node 104 may each update data maintained by the respective node to reflect the configuration shown in FIG. 6F. Table 6 depicts data as may be maintained by gateway node 104, Node D, Node C, Node F, Node A, Node E, and Node B when system 600 is configured as shown in FIG. 6F.

TABLE 6

| Node | In-Range List | Routing List | GW | Hop Count | Node Count |
|---|---|---|---|---|---|
| GW Node | D, F | D, C, F, A, E, B | Yes | 0 | 6 |
| Node D | GW, C, E | C, E | Yes | 1 | 2 |
| Node C | D | Null | Yes | 2 | 0 |
| Node F | GW | A, B | Yes | 1 | 2 |
| Node A | F, E, B | B | Yes | 2 | 1 |
| Node E | A, D | Null | Yes | 2 | 0 |
| Node B | A, C | Null | Yes | 3 | 0 |

As described above, FIGS. 6A-6F illustrate exemplary establishments of connections and data transmission paths between nodes to form various, dynamic configurations of wireless network system 600. In addition, an exemplary reconfiguration of connections and data transmission paths triggered by a change in geographic position of a node has also been described above in reference to FIGS. 1 and 2. An exemplary reconfiguration and optimization of connections and data transmission paths triggered by a connection failure will now be described in reference to FIGS. 7A-7D.

Figure 7A:
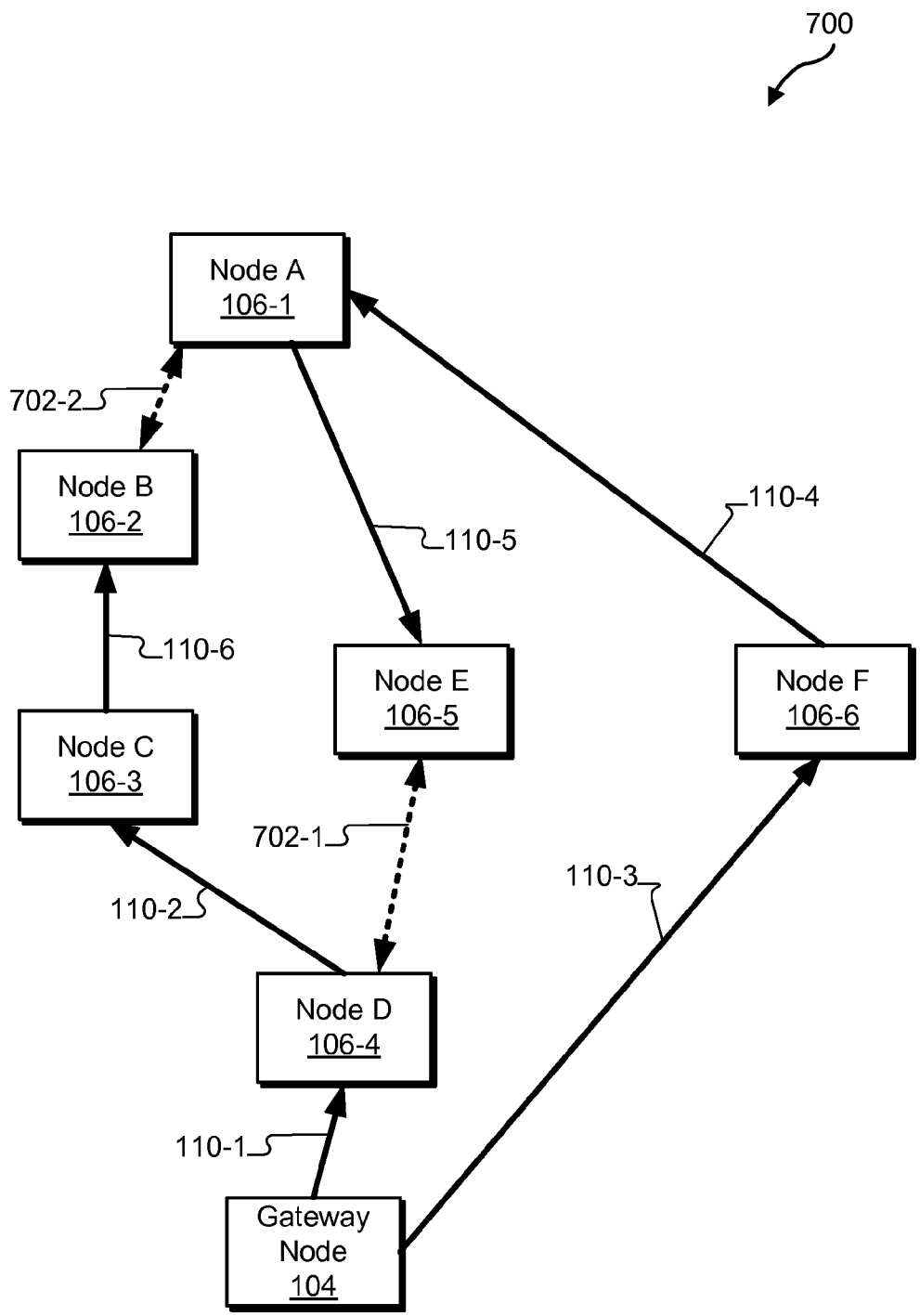
FIGS. 7A-7D illustrate a dynamic reconfiguration and optimization of a wireless network system.

FIG. 7A illustrates an exemplary configuration of a wireless network system 700 (or simply "system 700"). As shown, system 700 may include gateway node 104 and nodes 106-1 through 106-6 (i.e., Nodes A-F) interconnected by connections 110-1 through 110-6 as shown. Dashed arrow 702-1 represents that Node E and Node D are located within wireless transmission range of one another but that no connection 110 has been formed between Node E and Node D. Dashed arrow 702-2 represents that Node B and Node A are located within wireless transmission range of one another but that no connection 110 has been formed between Node B and Node A.

Figure 7B:
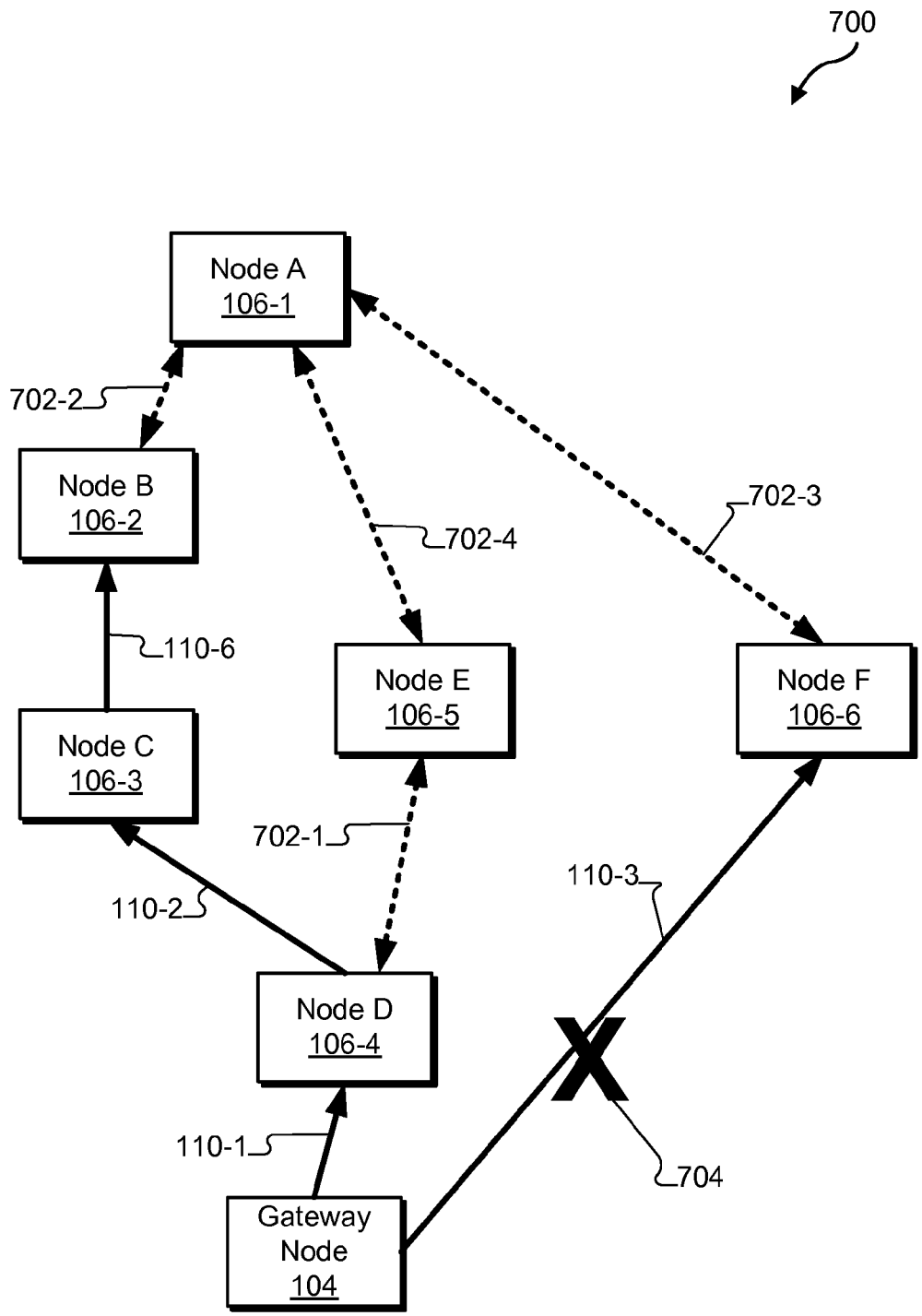

Connection 110-3 connecting gateway node 104 and Node F may fail. FIG. 7B illustrates system 700 with connection 110-3 in a failed state, as represented by an "X" symbol 704 in FIG. 7B. Accordingly, Node F has lost connectivity to gateway node 104. Node F may detect the loss of connectivity with gateway node 104 in any suitable way and notify Node A that connectivity to gateway node 104 has been lost. For example, Node F may update telemetry data for Node F to indicate that Node F is an isolated node (i.e., it does not have a connection path to a gateway) and remove data representative of Node A from a routing list maintained by Node F. Node F may transmit the updated telemetry data to Node A. Node A may receive the updated telemetry data from Node F, determine from the telemetry data that connectivity to gateway node 104 has been lost, and notify Node E that connectivity to gateway node 104 has been lost. For example, Node A may update telemetry data for Node A to indicate that Node A is an isolated node (i.e., it does not have a connection path to a gateway) and remove data representative of Node E from a routing list maintained by Node A. Node A may transmit the updated telemetry data to Node E. Node E may receive the updated telemetry data from Node A, determine from the telemetry data that connectivity to gateway node 104 has been lost, and update telemetry data for Node E accordingly. For example, Node E may update telemetry data for Node E to indicate that Node E is an isolated node (i.e., it does not have a connection path to a gateway).

In the above described manner, connections 110-4 and 110-5 may be selectively terminated based on telemetry data indicating a loss of connectivity to a gateway node. Accordingly, Node F, Node A, and Node E are now isolated nodes. Dashed arrow 702-3 represents that Node F and Node A are located within wireless transmission range of one another but that no connection 110 is established between Node F and Node A. Dashed arrow 702-4 represents that Node A and Node E are located within wireless transmission range of one another but that no connection 110 is established between Node A and Node E.

Figure 7C:
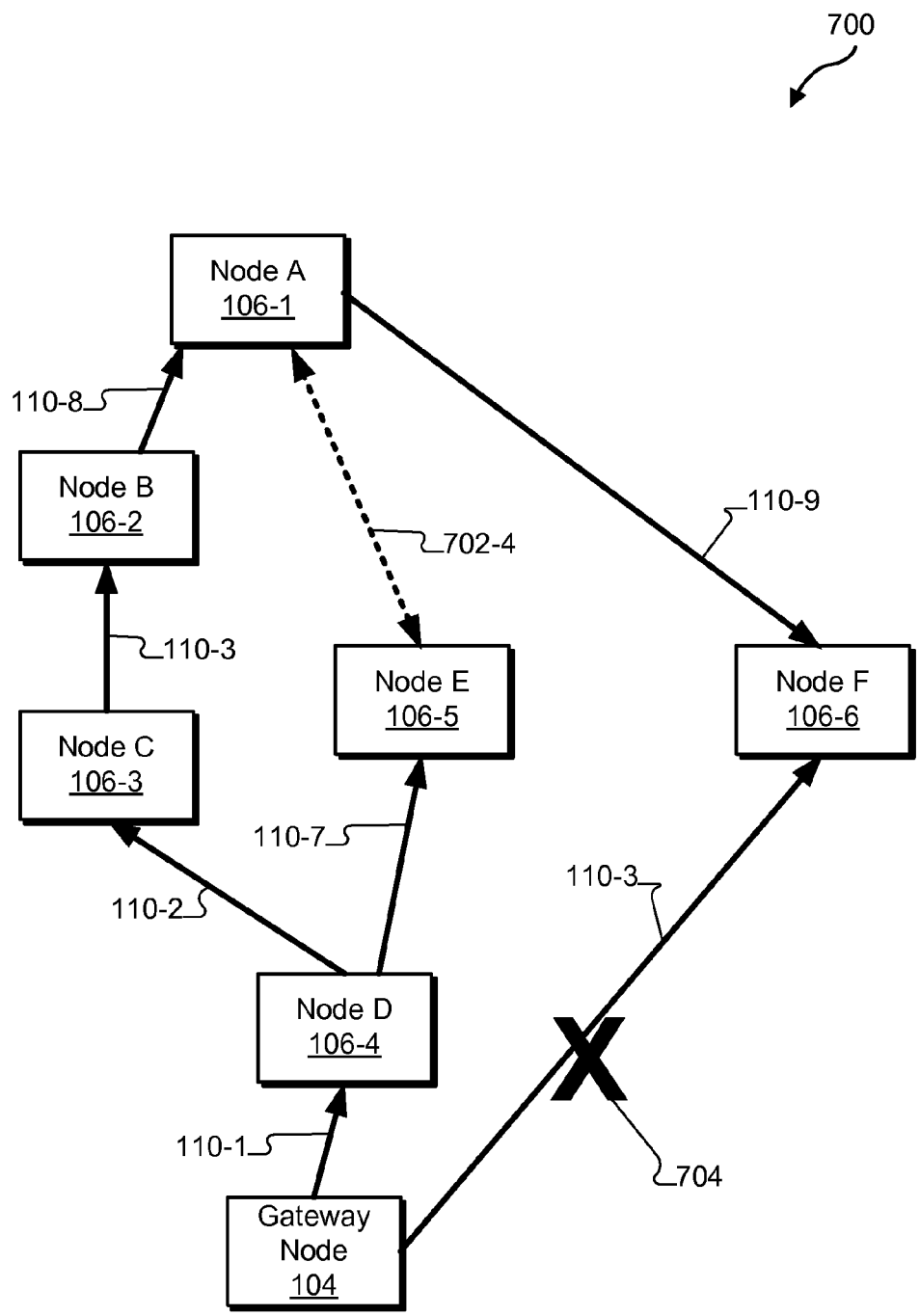
Figure 7D:
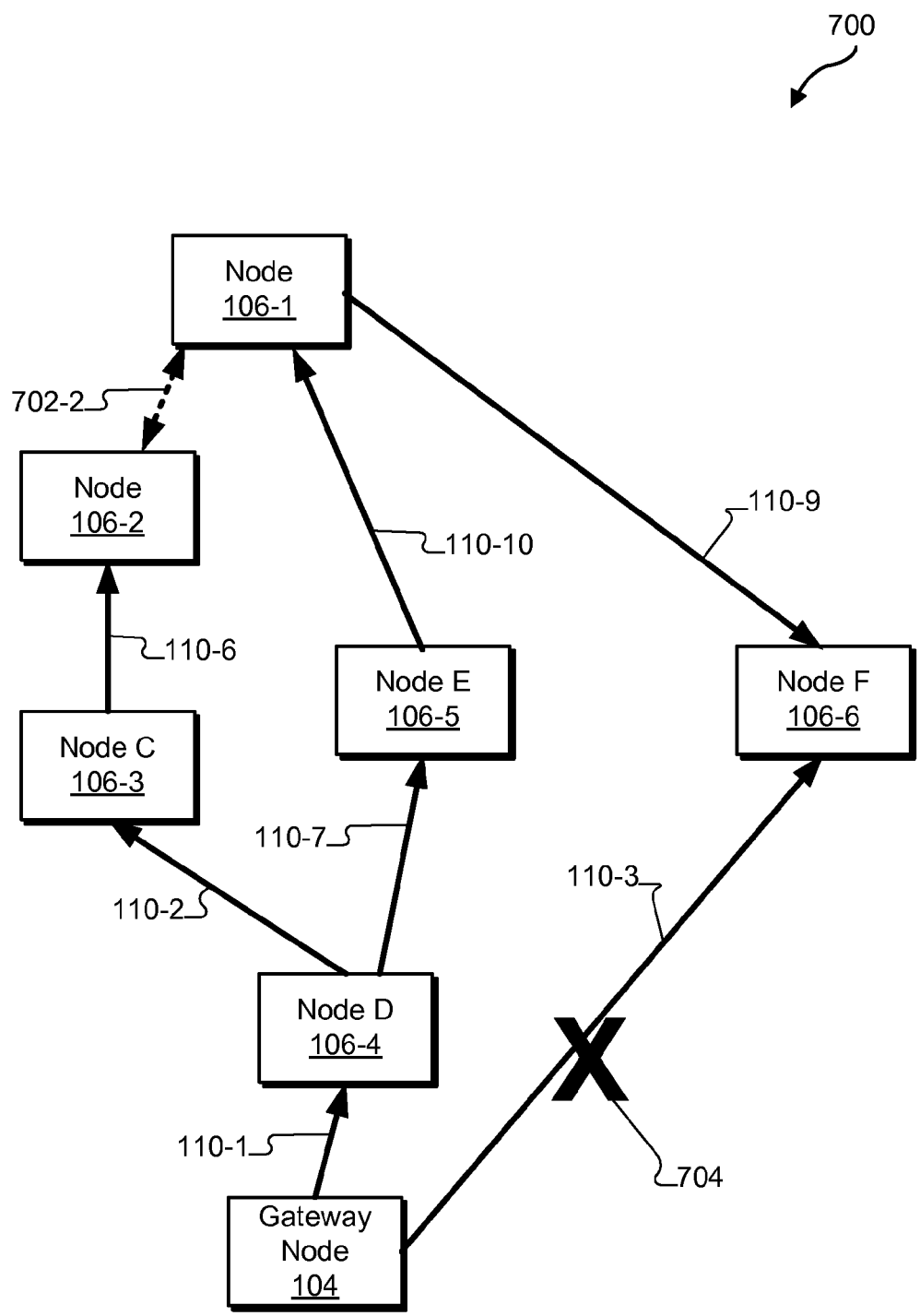

System 700 may automatically and dynamically reconfigure itself. For example, isolated Node A, Node E, and Node F may establish other connections based on exchanged telemetry data. To illustrate, Node E may determine, based on telemetry data received from Node D, that a connection path to gateway node 104 is available. In response, Node E may establish a connection 110-7 with Node D as shown in FIG. 7C. Similarly, Node A may determine, based on telemetry data received from Node B, that a connection path to gateway node 104 is available. In response, Node A may establish a connection 110-8 with Node B as shown in FIG. 7C. In certain examples, connections 110-7 and 110-8 may be established substantially concurrent to one another. After Node A has gained connectivity to gateway node 104, Node F may determine, based on telemetry data received from Node A, that a connection path to gateway node 104 is available. In response, Node F may establish a connection 110-9 with Node A as shown in FIG. 7C. In this manner, system 700 may be automatically reconfigured, based on exchanged and up-to-date telemetry data, to form connection paths to gateway node 104.

System 700 may be further configured to optimize connection paths to gateway node 104 and/or another common upstream node. To illustrate, in the configuration shown in FIG. 7C, Node A may detect from exchanged telemetry data that a connection path to gateway node 104 is available that is more optimal than the existing connection path from Node A to gateway node 104. In particular, the existing data transmission path from Node A to gateway node 104 that passes through Node B, Node C, and Node D has a hop count of "four." By comparison, Node A is located within wireless transmission range of Node E, which has a hop count of "two" to gateway node 104. Accordingly, Node A may determine that a new data transmission path with a hop count of "three" may be formed by establishing a connection with Node E. Based on this determination, Node E may dynamically and automatically terminate connection 110-8 with Node B and establish a connection 110-10 with Node E. Dashed arrow 702-2 again represents that Node B and Node A are located within wireless transmission range of one another but that no connection 110 is established between Node B and Node A. The nodes affected by the optimization and reconfiguration of connections may update accordingly. For example, nodes may continue to exchange telemetry data such that updated telemetry data reflecting the reconfigured connections are propagated within system 700.

In certain embodiments, an optimization, such as the optimization of Node A described above, may be accomplished by the optimizing node sending an optimization request to the upstream-connected node and to a desired non-connected node. The request may include a list of any nodes downstream from the optimizing node that should be rerouted for the optimization. Each of the nodes receiving the optimization request will forward the request upstream and buffer the request until the request is received from two different directions by a common upstream node (which may be a gateway node). The common upstream node may send a grant message to the requestor (i.e., the optimizing node) and a discard message upstream for any upstream nodes (if the common upstream node is not a gateway node) to clear buffers. The optimizing node receives the granted message and sends an end data message up the terminating data transmission path and a start data message up the new data transmission path.

When the common upstream node receives the start or end data message, the common upstream node may buffer all data from the optimizing node and any nodes downstream of the optimizing node until the other data message (i.e., the end or start data message) is received. Once both the start and end data messages are received, the common upstream node may send buffered data upstream (e.g., by bursting the buffered data upstream at a predetermined threshold). The common upstream node may send a confirmation message down the new data transmission path and a termination message down the terminating data transmission path. Nodes receiving the confirmation message may add the node list in the buffered confirmation message to their respective routing lists. Nodes receiving the termination message may remove nodes in the buffered termination message from their respective routing lists. The optimizing node may receive the confirmation message and the termination message and discard them to complete the optimization.

In any of the ways described above, one or more wireless-network-enabled devices may function as nodes configured to dynamically form wireless network configurations based on telemetry data exchanged between the nodes. The wireless network configurations are dynamic in nature such that the configurations may be dynamically configured and reconfigured based on changes to attributes of nodes and/or connections within the configurations. Accordingly, the principles described herein are well-suited to application in mobile devices configured for wireless network communications.

In certain embodiments, reliability of the dynamic wireless network configurations described herein may be based on wireless transmission ranges of participating devices and/or density of participating devices. As density and/or ranges decrease, reliability may also decrease. To help ensure a satisfactory level of reliability, in certain implementations, self-powered repeater nodes (e.g., self-powered buoys) may be deployed. In certain examples, repeater nodes may be configured to function like other nodes (e.g., nodes 106 of FIG. 1). In certain examples, repeater nodes may have hard-programmed connections to one or more gateways and may consequently be configured to function as gateway nodes.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:
a plurality of mobile wireless-network-enabled devices associated with a plurality of end users and that communicate with one another when within wireless transmission range of one another, one of the plurality of mobile wireless-network-enabled devices comprising a gateway to an established network;
wherein a mobile wireless-network-enabled device within the plurality of mobile wireless-network-enabled devices:
exchanges telemetry data with one or more other mobile wireless-network-enabled devices within the plurality of mobile wireless-network-enabled devices when located within the wireless transmission range of the one or more of the other mobile wireless-network-enabled devices, and
selectively and dynamically establishes an upstream connection to one of the one or more of the other mobile wireless-network-enabled devices, based on the exchanged telemetry data, to form a data transmission path between the mobile wireless-network-enabled device and the gateway,
detects another one of the one or more of the other mobile wireless-network-enabled devices within wireless transmission range of the mobile wireless-network-enabled device,
exchanges telemetry data with the another one of the one or more of the other mobile wireless-network-enabled devices,
determines, based on the telemetry data exchanged with the another one of the one or more of the other mobile wireless-network-enabled devices, that the another one of the one or more of the other mobile wireless-network-enabled devices is an option for the mobile wireless-network-enabled device to connect to in order to form an alternative data transmission path between the mobile wireless-network-enabled device and the gateway,
sends an optimization request to the one of the one or more of the other mobile wireless-network-enabled devices and to the another one of the one or more of the other mobile wireless-network-enabled devices, wherein the optimization request is forwarded upstream by both the one of the one or more of the other mobile wireless-network enabled devices and the another one of the one or more of the other mobile wireless-network-enabled devices until the optimization request is received from two different directions by an upstream node that is common to both the data transmission path and the alternative data transmission path,
receives a grant message from the upstream node indicating that the alternative data transmission path is more optimal than the data transmission path,
establishes, in response to the grant message, an alternative upstream connection to the another one of the one or more of the other mobile wireless-network-enabled devices to form the alternative data transmission path between the mobile wireless-network-enabled device and the gateway, and
terminates, in response to the grant message, the established upstream connection to the one of the one or more of the other mobile wireless-network-enabled devices,
wherein no mobile wireless-network-enabled device in the plurality of mobile wireless-network-enabled devices in the data transmission path or the alternative data transmission path maintains more than one single upstream connection at any given time.

2. The system of claim 1, wherein the mobile wireless-network-enabled device has no more than one of the data transmission path and the alternative data transmission path to the gateway at any given time.

3. The system of claim 1, wherein the mobile wireless-network-enabled device operates independently by making at least one of an independent network connectivity determination and an independent data transmission routing determination.

4. The system of claim 1, wherein:
   the exchanged telemetry data associated with the one or more of the other mobile wireless-network-enabled devices within the plurality of mobile wireless-network-enabled devices comprises data indicating a number of hops from each of the one or more other mobile wireless-network-enabled devices to the gateway; and
   the mobile wireless-network-enabled device selectively and dynamically establishes the upstream connection with the one of the one or more of the other mobile wireless-network-enabled devices based at least in further part on a comparison of the number of hops from each of the one or more other mobile wireless-network-enabled devices to the gateway.

5. The system of claim 1, wherein:
   the exchanged telemetry data associated with the one or more of the other mobile wireless-network-enabled devices within the plurality of mobile wireless-network-enabled devices comprises data indicating a downstream node count associated with each of the one or more other mobile wireless-network-enabled devices; and
   the mobile wireless-network-enabled device selectively and dynamically establishes the upstream connection with the one of the one or more of the other mobile wireless-network-enabled devices based at least in further part on a comparison of the downstream node count associated with each of the one or more other mobile wireless-network-enabled devices.

6. The system of claim 1, wherein the mobile wireless-network-enabled device further
   maintains routing data indicating one or more downstream-connected mobile wireless-network-enabled devices,
   receives a downstream data transmission,
   determines whether the downstream data transmission is targeted for one of the downstream-connected mobile wireless-network-enabled devices based on the routing data,
   broadcasts the downstream data transmission when the downstream data transmission is targeted for one of the downstream-connected mobile wireless-network-enabled devices, and
   refrains from broadcasting the downstream data transmission when the downstream data transmission is not targeted for one of the downstream-connected mobile wireless-network-enabled devices.

7. The system of claim 1, wherein the telemetry data associated with the one or more of the other mobile wireless-network-enabled devices includes at least one of a hop count and a node count and the telemetry data associated with the another one of the one or more of the other mobile wireless-network-enabled devices includes at least one of a hop count and a node count and wherein the alternative data transmission path is determined to be more optimal than the data transmission path based on a comparison of the hop count or node count indicated by the telemetry data associated with the one or more of the other mobile wireless-network-enabled devices and the hop count or node count indicated by the telemetry data associated with the another one of the one or more of the other mobile wireless-network-enabled devices.

8. The system of claim 1, wherein the mobile wireless-network-enabled device exchanges the telemetry data by periodically exchanging messages with the one or more of the other mobile wireless-network-enabled devices within the plurality of mobile wireless-network-enabled devices when located within the wireless transmission range of the one or more of the other mobile wireless-network-enabled devices.

9. The system of claim 8, wherein the mobile wireless-network-enabled device periodically broadcasts a beacon message to establish an initial handshake with any other mobile wireless-network-enabled device that has moved within the wireless transmission range of the mobile wireless-network-enabled device.

10. The system of claim 8, wherein the mobile wireless-network-enabled device exchanges the telemetry data by
    receiving a data transmission from the one of the one or more other mobile wireless-network-enabled devices,
    stripping telemetry data associated with the one of the one or more other mobile wireless-network-enabled devices from the data transmission,
    inserting telemetry data for the mobile wireless-network-enabled device in the data transmission, and
    re-transmitting the data transmission.

11. The system of claim 1, wherein:
    the one of the plurality of mobile wireless-network-enabled devices comprising the gateway to the established network is land-based; and
    the remainder of the plurality of mobile wireless-network-enabled devices are sea-based mobile devices.

12. The system of claim 1, wherein the plurality of mobile wireless-network-enabled devices associated with the plurality of end users forms a secure dynamic wireless network environment.

13. The system of claim 1, wherein the gateway is configured to regulate network throughput based on a number of mobile wireless-network-enabled devices in the data transmission path or the alternative data transmission path.

14. The system of claim 1, wherein the data transmission path and the alternative data transmission path between the mobile wireless-network-enabled device and the gateway, when established, are each optimized for sending communications to the gateway and receiving communications from the gateway.

15. The system of claim 1, wherein the another one of the one or more of the other mobile wireless-network-enabled devices is detected within the wireless transmission range of the mobile wireless-network-enabled device because the another one of the one or more of the other mobile wireless-network-enabled devices moved from being out of the wireless transmission range of the mobile wireless-network-enabled device to being within the wireless transmission range of the mobile wireless-network-enabled device.

16. The system of claim 1, wherein the mobile wireless-network-enabled device further:
    sends an end data message up the data transmission path to the upstream node, and
    sends a start data message up the alternative data transmission path to the upstream node.

17. The system of claim 16, wherein the mobile wireless-network-enabled device further:
    receives, in response to the end data message and the start data message being received by the upstream node, a confirmation message through the alternative data transmission path, and
    receives, in response to the end data message and the start data message being received by the upstream node, a termination message through the data transmission path.

18. The system of claim 1, wherein the optimization request includes a list of nodes downstream from the mobile wireless-network-enabled device.

19. A system comprising:

a plurality of mobile wireless-network-enabled devices associated with a plurality of end users and that communicate with one another when within wireless transmission range of one another, one of the plurality of mobile wireless-network-enabled devices comprising a gateway to an established network;

wherein a mobile wireless-network-enabled device within the plurality of mobile wireless-network-enabled devices:

periodically exchanges telemetry data with one or more other mobile wireless-network-enabled devices within the plurality of mobile wireless-network-enabled devices when located within the wireless transmission range of the one or more of the other mobile wireless-network-enabled devices, selectively and dynamically establishes an upstream connection to one of the one or more of the other mobile wireless-network-enabled devices, based on the exchanged telemetry data, to form a dynamic wireless network configuration including a data transmission path between the mobile wireless-network-enabled device and the gateway, detects another one of the one or more of the other mobile wireless-network-enabled devices within the wireless transmission range of the mobile wireless-network-enabled device, exchanges telemetry data with the another one of the one or more of the other mobile wireless-network-enabled devices, determines, based on the telemetry data exchanged with the another one of the one or more of the other mobile wireless-network-enabled devices, that the another one of the one or more of the other mobile wireless-network-enabled devices is an option for the mobile wireless-network-enabled device to connect to in order to form an alternative dynamic wireless network configuration including an alternative data transmission path between the mobile wireless-network-enabled device and the gateway, sends an optimization request to the one of the one or more of the other mobile wireless-network-enabled devices and to the another one of the one or more of the other mobile wireless-network-enabled devices, wherein the optimization request is forwarded upstream by both the one of the one or more of the other mobile wireless-network-enabled devices and the another one of the one or more of the other mobile wireless-network-enabled devices until the optimization request is received from two different directions by an upstream node that is common to both the data transmission path and the alternative data transmission path, receives a grant message from the upstream node indicating that the alternative data transmission path is more optimal than the data transmission path, establishes, in response to the grant message, an alternative upstream connection to the another one of the one or more of the other mobile wireless-network-enabled devices to form the alternative data transmission path between the mobile wireless-network-enabled device and the gateway, and terminates, in response to the grant message, the established upstream connection to the one of the one or more of the other mobile wireless-network-enabled devices, wherein no mobile wireless-network-enabled device in the plurality of mobile wireless-network-enabled devices in the data transmission path or the alternative data transmission path maintains more than one single upstream connection at any given time.

20. A method comprising:

maintaining, by a first mobile wireless-network-enabled device associated with a first end user, telemetry data associated with the first mobile wireless-network-enabled device;

exchanging, by the first mobile wireless-network-enabled device and with a second mobile wireless-network-enabled device associated with a second end user and located within a wireless transmission range, the telemetry data associated with the first mobile wireless-network-enabled device for telemetry data associated with the second mobile wireless-network-enabled device;

analyzing, by the first mobile wireless-network-enabled device, the telemetry data associated with the second mobile wireless-network-enabled device;

selectively and dynamically establishing, by the first mobile wireless-network-enabled device and based on the telemetry data associated with the second mobile wireless-network-enabled device, an upstream connection to the second mobile wireless-network-enabled device to form a data transmission path between the first mobile wireless-network-enabled device and the gateway;

detecting, by the first mobile wireless-network-enabled device, a third mobile wireless-network-enabled device associated with a third end user and located within the wireless transmission range of the first mobile wireless-network-enabled device;

exchanging, by the first mobile wireless-network-enabled device, telemetry data with the third mobile wireless-network-enabled device;

determining, by the first mobile wireless-network-enabled device and based on the telemetry data exchanged with the third mobile wireless-network-enabled device, that the third mobile wireless-network-enabled device is an option for the first mobile wireless-network-enabled device to connect to in order to form an alternative data transmission path between the first mobile wireless-network-enabled device and the gateway;

sending, by the first mobile wireless-network-enabled device, an optimization request to the second mobile wireless-network-enabled device and to the third mobile wireless-network-enabled device, wherein the optimization request is forwarded upstream by both the second wireless-network-enabled device and the third wireless-network-enabled device until the optimization request is received from two different directions by an upstream node that is common to both the data transmission path and the alternative data transmission path;

receiving, by the first mobile wireless-network-enabled device, a grant message from the upstream node indicating that the alternative data transmission path is more optimal than the data transmission path;

establishing, by the first mobile wireless-network-enabled device and in response to the grant message, an alternative upstream connection to the third mobile wireless-network-enabled device to form the alternative data transmission path between the first mobile wireless-network-enabled device and the gateway; and terminating, by the first mobile wireless-network-enabled device and in response to the grant message, the established upstream connection to the second mobile wireless-network-enabled device, wherein none of the first mobile wireless-network-enabled device, the second mobile wireless-network-enabled device, or the third mobile wireless-network-enabled device that form the transmission path or the alternative data transmission path maintains more than one single upstream connection at any given time.

21. The method of claim 20, further comprising:

maintaining, by the first mobile wireless-network-enabled device, routing data indicating one or more downstream-connected mobile wireless-network-enabled devices;

receiving, by the first mobile wireless-network-enabled device, a downstream data transmission from the second mobile wireless-network-enabled device;

determining, by the first mobile wireless-network-enabled device and based on the routing data, that the downstream data transmission is directed to one of the one or more downstream-connected mobile wireless-network-enabled devices; and broadcasting, by the first mobile wireless-network-enabled device, the downstream data transmission in response to the determination.

22. The method of claim 21, further comprising:

stripping, by the first mobile wireless-network-enabled device, updated telemetry data associated with the second mobile wireless-network-enabled device from the downstream data transmission; and inserting, by the first mobile wireless-network-enabled device, updated telemetry data associated with the first mobile wireless-network-enabled device into the downstream data transmission before the broadcasting of the downstream data transmission by the first mobile wireless-network-enabled device.

23. The method of claim 20, embodied as computer-executable instructions on at least one non-transitory computer-readable medium.

* * * * *